United States Patent
Landis et al.

(10) Patent No.: US 11,432,240 B2
(45) Date of Patent: Aug. 30, 2022

(54) NON-COHERENT WAKE-UP SIGNAL

(71) Applicant: QUALCOMM Incorporated, San Diego, CA (US)

(72) Inventors: Shay Landis, Hod Hasharon (IL); Assaf Touboul, Netanya (IL); Gideon Shlomo Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 194 days.

(21) Appl. No.: 16/881,842

(22) Filed: May 22, 2020

(65) Prior Publication Data

US 2021/0368440 A1 Nov. 25, 2021

(51) Int. Cl.
| | |
|---|---|
| H04W 4/00 | (2018.01) |
| H04W 52/02 | (2009.01) |
| H04L 27/233 | (2006.01) |
| H04L 27/26 | (2006.01) |
| H04W 72/04 | (2009.01) |
| H04L 5/00 | (2006.01) |

(52) U.S. Cl.
CPC ....... *H04W 52/0229* (2013.01); *H04L 27/233* (2013.01); *H04L 27/2607* (2013.01); *H04W 52/0235* (2013.01); *H04W 72/042* (2013.01); *H04L 5/0007* (2013.01)

(58) Field of Classification Search
None
See application file for complete search history.

(56) References Cited

U.S. PATENT DOCUMENTS

| | | | |
|---|---|---|---|
| 9,872,252 B1* | 1/2018 | Ang | H04W 52/0216 |
| 11,234,189 B2* | 1/2022 | Awoniyi-Oteri | H04W 72/14 |
| 11,234,191 B2* | 1/2022 | Lin | H04W 52/0235 |
| 2007/0049338 A1* | 3/2007 | He | H04W 88/02 |
| | | | 455/349 |
| 2018/0183503 A1* | 6/2018 | Rahman | H04W 72/042 |
| 2019/0394733 A1* | 12/2019 | Yang | H04B 7/0628 |
| 2020/0068387 A1* | 2/2020 | Dou | H04B 1/71075 |
| 2020/0084720 A1* | 3/2020 | Marin | H04W 52/0216 |
| 2020/0137682 A1* | 4/2020 | Jia | H04W 36/00837 |
| 2021/0014788 A1* | 1/2021 | Sahin | H04W 52/0219 |
| 2021/0153120 A1* | 5/2021 | Atungsiri | H04W 76/11 |
| 2022/0021494 A1* | 1/2022 | Mazloum | H04L 27/261 |

FOREIGN PATENT DOCUMENTS

| | | |
|---|---|---|
| EP | 3488640 A1 | 5/2019 |
| EP | 3634046 A1 | 4/2020 |
| WO | WO-2019030337 A1 | 2/2019 |
| WO | WO-2019229266 A1 | 12/2019 |

OTHER PUBLICATIONS

International Search Report and Written Opinion—PCT/US2021/026879—ISAEPO—dated Jul. 30, 2021.

* cited by examiner

*Primary Examiner* — Bob A Phunkulh
(74) *Attorney, Agent, or Firm* — Holland & Hart LLP

(57) ABSTRACT

Methods, systems, and devices for wireless communications are described. A user equipment (UE) may enter a lower power mode of operation, and may receive, from a base station, a non-coherent signal while the UE is operating in the lower power mode. The UE may identify an indication to transition from the lower power mode to a higher power mode of operation based at least in part on receiving the non-coherent signal. The UE may enter the higher power mode based at least in part on identifying the indication.

30 Claims, 19 Drawing Sheets

NON-COHERENT WAKE-UP SIGNAL

FIELD OF TECHNOLOGY

The following relates generally to wireless communications and more specifically to a non-coherent wake-up signal.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications, a UE may enter a lower power mode of operation (e.g., connected discontinuous reception cycle) in order to conserve power. During the lower power mode, the UE may operate in a "sleep and wake" cycle, in which the UE may periodically wake to monitor a physical downlink control channel (PDCCH) in order to identify whether there is traffic waiting to be transmitted to the UE. To monitor the PDCCH, the UE may activate the baseband component of the UE during each wake cycle.

Accordingly, even when no traffic is waiting to be transmitted to the UE, the UE may utilize the baseband component, leading to high power consumption.

SUMMARY

The described techniques relate to improved methods, systems, devices, and apparatuses that support a non-coherent wake-up signal (WUS). Generally, the described techniques provide for non-coherent WUS, which may enable a user equipment (UE) to reduce power consumption when the UE is operating in a lower power mode of operation. The UE may enter a lower power mode of operation, and receive a non-coherent signal while the UE is operating in the lower power mode of operation. During the lower power mode, a wake-up component may be active, and a baseband component of the UE may be inactive. In this regard, the wake-up component may identify and/or decode the non-coherent signal without activating the baseband component. The non-coherent signal may include an indication to transition from the lower power mode to a higher power mode of. The wake-up component may then cause the UE to enter the higher power mode based on identifying the indication. These techniques may simplify processing used to process a wake-up signal, thereby decreasing power consumption of the lower power mode at the UE. Further, by processing the non-coherent signal with the wake-up component, the UE may avoid activating (e.g., waking up) the more power-intensive baseband component until traffic is waiting to be transmitted to the UE.

A method of wireless communication at a user equipment is described. The method may include entering a lower power mode of operation, receiving, from a base station, a non-coherent signal while the user equipment is operating in the lower power mode, identifying, based on receiving the non-coherent signal, an indication to transition from the lower power mode to a higher power mode of operation, and entering the higher power mode based on identifying the indication.

An apparatus for wireless communication at a user equipment is described. The apparatus may include a processor, memory coupled with the processor, and instructions stored in the memory. The instructions may be executable by the processor to cause the apparatus to enter a lower power mode of operation, receive, from a base station, a non-coherent signal while the user equipment is operating in the lower power mode, identify, based on receiving the non-coherent signal, an indication to transition from the lower power mode to a higher power mode of operation, and enter the higher power mode based on identifying the indication.

Another apparatus for wireless communication at a user equipment is described. The apparatus may include means for entering a lower power mode of operation, receiving, from a base station, a non-coherent signal while the user equipment is operating in the lower power mode, identifying, based on receiving the non-coherent signal, an indication to transition from the lower power mode to a higher power mode of operation, and entering the higher power mode based on identifying the indication.

A non-transitory computer-readable medium storing code for wireless communication at a user equipment is described. The code may include instructions executable by a processor to enter a lower power mode of operation, receive, from a base station, a non-coherent signal while the user equipment is operating in the lower power mode, identify, based on receiving the non-coherent signal, an indication to transition from the lower power mode to a higher power mode of operation, and enter the higher power mode based on identifying the indication.

In some examples of the method, apparatuses, and non-transitory computer-readable medium described herein, identifying the indication to transition from the lower power mode of operation to the higher power mode of operation may include operations, features, means, or instructions for identifying, with a wake-up component associated with a first power source of the user equipment that may be isolated from a second power source associated with a baseband component, the indication to transition from the lower power mode to the higher power mode based on receiving the non-coherent signal.

In some examples of the method, apparatuses, and non-transitory computer-readable medium described herein, the wake-up component includes a processor, a field-programmable gate array (FPGA), or an application-specific integrated circuit (ASIC).

Some examples of the method, apparatuses, and non-transitory computer-readable medium described herein may further include operations, features, means, or instructions for identifying, within the non-coherent signal, a first resource element and a second resource element, and performing one or more differential decoding operations on the first resource element and the second resource element to generate an indicator value, where identifying the indication to transition from the lower power mode to the higher power mode may be based on the indicator value.

Some examples of the method, apparatuses, and non-transitory computer-readable medium described herein may further include operations, features, means, or instructions for multiplying the first resource element by a conjugate of the second resource element, where performing the one or more differential decoding operations may be based on multiplying the first resource element by the conjugate of the second resource element.

In some examples of the method, apparatuses, and non-transitory computer-readable medium described herein, the indicator value includes a logarithm likelihood ratio (LLR) value.

Some examples of the method, apparatuses, and non-transitory computer-readable medium described herein may further include operations, features, means, or instructions for identifying an orthogonal frequency division multiplexing (OFDM) symbol within the non-coherent signal, and removing a cyclic prefix from the OFDM symbol to retrieve the first resource element, where identifying the first resource element may be based on removing the cyclic prefix from the OFDM symbol.

In some examples of the method, apparatuses, and non-transitory computer-readable medium described herein, the second resource element immediately proceeds the first resource element.

In some examples of the method, apparatuses, and non-transitory computer-readable medium described herein, the non-coherent signal may be conveyed over a PDCCH.

Some examples of the method, apparatuses, and non-transitory computer-readable medium described herein may further include operations, features, means, or instructions for transmitting a control message including a second indication that the user equipment may be configured to receive the non-coherent signal as part of a configuration procedure, where receiving the non-coherent signal may be based on transmitting the control message.

Some examples of the method, apparatuses, and non-transitory computer-readable medium described herein may further include operations, features, means, or instructions for transmitting the control message including the indication that the user equipment may be configured to receive the non-coherent signal occurs prior to entering the lower power mode of operation.

In some examples of the method, apparatuses, and non-transitory computer-readable medium described herein, the lower power mode of operation includes an inactive period of a discontinuous reception cycle, and the higher power mode of operation includes an active period of the discontinuous reception cycle.

A method of wireless communication at a base station is described. The method may include identifying that a user equipment is in a lower power mode of operation, identifying traffic waiting to be transmitted to the user equipment, and transmitting, based on identifying the traffic, a non-coherent signal to the user equipment while the user equipment is operating in the lower power mode, the non-coherent signal including an indication for the user equipment to transition from the lower power mode to a higher power mode of operation to receive the traffic.

An apparatus for wireless communication at a base station is described. The apparatus may include a processor, memory coupled with the processor, and instructions stored in the memory. The instructions may be executable by the processor to cause the apparatus to identify that a user equipment is in a lower power mode of operation, identify traffic waiting to be transmitted to the user equipment, and transmit, based on identifying the traffic, a non-coherent signal to the user equipment while the user equipment is operating in the lower power mode, the non-coherent signal including an indication for the user equipment to transition from the lower power mode to a higher power mode of operation to receive the traffic.

Another apparatus for wireless communication at a base station is described. The apparatus may include means for identifying that a user equipment is in a lower power mode of operation, identifying traffic waiting to be transmitted to the user equipment, and transmitting, based on identifying the traffic, a non-coherent signal to the user equipment while the user equipment is operating in the lower power mode, the non-coherent signal including an indication for the user equipment to transition from the lower power mode to a higher power mode of operation to receive the traffic.

A non-transitory computer-readable medium storing code for wireless communication at a base station is described. The code may include instructions executable by a processor to identify that a user equipment is in a lower power mode of operation, identify traffic waiting to be transmitted to the user equipment, and transmit, based on identifying the traffic, a non-coherent signal to the user equipment while the user equipment is operating in the lower power mode, the non-coherent signal including an indication for the user equipment to transition from the lower power mode to a higher power mode of operation to receive the traffic.

Some examples of the method, apparatuses, and non-transitory computer-readable medium described herein may further include operations, features, means, or instructions for transmitting, to the user equipment, the traffic to the user equipment based on transmitting the non-coherent signal.

Some examples of the method, apparatuses, and non-transitory computer-readable medium described herein may further include operations, features, means, or instructions for identifying that the user equipment may be in the higher power mode of operation based on transmitting the non-coherent signal, where transmitting the traffic may be based on transmitting the traffic to the user equipment.

In some examples of the method, apparatuses, and non-transitory computer-readable medium described herein, transmitting the non-coherent signal to the user equipment may include operations, features, means, or instructions for transmitting the non-coherent signal via a PDCCH.

Some examples of the method, apparatuses, and non-transitory computer-readable medium described herein may further include operations, features, means, or instructions for receiving, from the user equipment, a control message including a second indication that the user equipment may be configured to receive the non-coherent signal as part of a configuration procedure, where receiving the non-coherent signal may be based on transmitting the control message.

Some examples of the method, apparatuses, and non-transitory computer-readable medium described herein may further include operations, features, means, or instructions for identifying a set of one or more user equipment operating in the lower power mode of operation, identifying traffic waiting to be transmitted to at least one user equipment of the set of one or more user equipment, and transmitting, based on identifying the traffic, the non-coherent signal to the set of one or more user equipment while the set of one or more user equipment may be operating in the lower power mode, the non-coherent signal including a second indication for each user equipment of the set of one or more user equipment to transition from the lower power mode to the higher power mode of operation to receive the traffic.

A method of wireless communication at a user equipment is described. The method may include entering a lower power mode of operation, receiving, from a base station, a non-coherent signal while the user equipment is operating in the lower power mode, identifying, with a wake-up component associated with a first power source of the user equipment that is isolated from a second power source associated with a baseband component, an indication to transition from operating in the lower power mode to a higher power mode of operation, where the indication to transition from the lower power mode is based on receiving the non-coherent signal, and activating, with the wake-up component, the baseband component and causing the user equipment to enter the higher power mode based on identifying the indication.

An apparatus for wireless communication at a user equipment is described. The apparatus may include a processor, memory coupled with the processor, and instructions stored in the memory. The instructions may be executable by the processor to cause the apparatus to enter a lower power mode of operation, receive, from a base station, a non-coherent signal while the user equipment is operating in the lower power mode, identify, with a wake-up component associated with a first power source of the user equipment that is isolated from a second power source associated with a baseband component, an indication to transition from operating in the lower power mode to a higher power mode of operation, where the indication to transition from the lower power mode is based on receiving the non-coherent signal, and activate, with the wake-up component, the baseband component and causing the user equipment to enter the higher power mode based on identifying the indication.

Another apparatus for wireless communication at a user equipment is described. The apparatus may include means for entering a lower power mode of operation, receiving, from a base station, a non-coherent signal while the user equipment is operating in the lower power mode, identifying, with a wake-up component associated with a first power source of the user equipment that is isolated from a second power source associated with a baseband component, an indication to transition from operating in the lower power mode to a higher power mode of operation, where the indication to transition from the lower power mode is based on receiving the non-coherent signal, and activating, with the wake-up component, the baseband component and causing the user equipment to enter the higher power mode based on identifying the indication.

A non-transitory computer-readable medium storing code for wireless communication at a user equipment is described. The code may include instructions executable by a processor to enter a lower power mode of operation, receive, from a base station, a non-coherent signal while the user equipment is operating in the lower power mode, identify, with a wake-up component associated with a first power source of the user equipment that is isolated from a second power source associated with a baseband component, an indication to transition from operating in the lower power mode to a higher power mode of operation, where the indication to transition from the lower power mode is based on receiving the non-coherent signal, and activate, with the wake-up component, the baseband component and causing the user equipment to enter the higher power mode based on identifying the indication.

In some examples of the method, apparatuses, and non-transitory computer-readable medium described herein, identifying the indication to transition from the lower power mode to the higher power mode may include operations, features, means, or instructions for identifying, within the non-coherent signal, a first resource element and a second resource element, and performing one or more differential decoding operations on the first resource element and the second resource element to generate an indicator value, where identifying the indication to transition from the lower power mode to the higher power mode may be based on the indicator value.

In some examples of the method, apparatuses, and non-transitory computer-readable medium described herein, receiving the non-coherent signal may include operations, features, means, or instructions for receiving the non-coherent signal via a PDCCH.

Some examples of the method, apparatuses, and non-transitory computer-readable medium described herein may further include operations, features, means, or instructions for transmitting a control message including a second indication that the user equipment may be configured to receive the non-coherent signal as part of a configuration procedure, where receiving the non-coherent signal may be based on transmitting the control message.

Some examples of the method, apparatuses, and non-transitory computer-readable medium described herein may further include operations, features, means, or instructions for transmitting the control message including the indication that the user equipment may be configured to receive the non-coherent signal occurs prior to entering the lower power mode of operation.

In some examples of the method, apparatuses, and non-transitory computer-readable medium described herein, entering the lower power mode of operation may include operations, features, means, or instructions for entering an inactive period of a discontinuous reception cycle, and where entering the higher power mode of operation.

In some examples of the method, apparatuses, and non-transitory computer-readable medium described herein, the wake-up component includes a processor, an FPGA, or an ASIC.

A method of wireless communications at a user equipment is described. The method may include a radio frequency component for receiving one or more signals from a base station, the radio frequency component configured to receive a non-coherent signal from the base station when the user equipment operates in a lower power mode, a baseband component coupled with the radio frequency component and for processing the one or more signals received from the base station, where at least a portion of the baseband component is inactive while the user equipment operates in the lower power mode, and a wake-up component coupled with the radio frequency component and the baseband component, the wake-up component for identifying an indication in the non-coherent signal that the user equipment is to transition from operating in the lower power mode to operating in a higher power mode, the wake-up component for activating the portion of the baseband component based on identifying the indication.

An apparatus for wireless communications at a user equipment is described. The apparatus may include a processor, memory coupled with the processor, and instructions stored in the memory. The instructions may be executable by the processor to cause the apparatus to a radio frequency component for receiving one or more signals from a base station, the radio frequency component configured to receive a non-coherent signal from the base station when the user equipment operates in a lower power mode, a baseband component coupled with the radio frequency component and for processing the one or more signals received from the base station, where at least a portion of the baseband component is inactive while the user equipment operates in the lower power mode, and a wake-up component coupled with the radio frequency component and the baseband component, the wake-up component for identifying an indication in the non-coherent signal that the user equipment is to transition from operating in the lower power mode to operating in a higher power mode, the wake-up component for activating the portion of the baseband component based on identifying the indication.

Another apparatus for wireless communications at a user equipment is described. The apparatus may include means for a radio frequency component for receiving one or more signals from a base station, the radio frequency component configured to receive a non-coherent signal from the base station when the user equipment operates in a lower power mode, a baseband component coupled with the radio frequency component and for processing the one or more signals received from the base station, where at least a portion of the baseband component is inactive while the user equipment operates in the lower power mode, and a wake-up component coupled with the radio frequency component and the baseband component, the wake-up component for identifying an indication in the non-coherent signal that the user equipment is to transition from operating in the lower power mode to operating in a higher power mode, the wake-up component for activating the portion of the baseband component based on identifying the indication.

A non-transitory computer-readable medium storing code for wireless communications at a user equipment is described. The code may include instructions executable by a processor to a radio frequency component for receiving one or more signals from a base station, the radio frequency component configured to receive a non-coherent signal from the base station when the user equipment operates in a lower power mode, a baseband component coupled with the radio frequency component and for processing the one or more signals received from the base station, where at least a portion of the baseband component is inactive while the user equipment operates in the lower power mode, and a wake-up component coupled with the radio frequency component and the baseband component, the wake-up component for identifying an indication in the non-coherent signal that the user equipment is to transition from operating in the lower power mode to operating in a higher power mode, the wake-up component for activating the portion of the baseband component based on identifying the indication.

In some examples of the method, apparatuses, and non-transitory computer-readable medium described herein, the wake-up component may be associated with a first power source of the user equipment that may be isolated from a second power source associated with the baseband component.

Some examples of the method, apparatuses, and non-transitory computer-readable medium described herein may further include operations, features, means, or instructions for identifying, within the non-coherent signal, a first resource element and a second resource element proceeding the first resource element, and perform one or more differential decoding operations on the first resource element and the second resource element to generate an indicator value where identifying the indication to transition from the lower power mode to the higher power mode may be based on the indicator value.

Some examples of the method, apparatuses, and non-transitory computer-readable medium described herein may further include operations, features, means, or instructions for transmitting a control message including a second indication that the user equipment may be configured to receive the non-coherent signal as part of a configuration procedure, where receiving the non-coherent signal may be based on transmitting the control message.

In some examples of the method, apparatuses, and non-transitory computer-readable medium described herein, the wake-up component includes a processor, an FPGA, or an ASIC.

DETAILED DESCRIPTION

Figure 1:
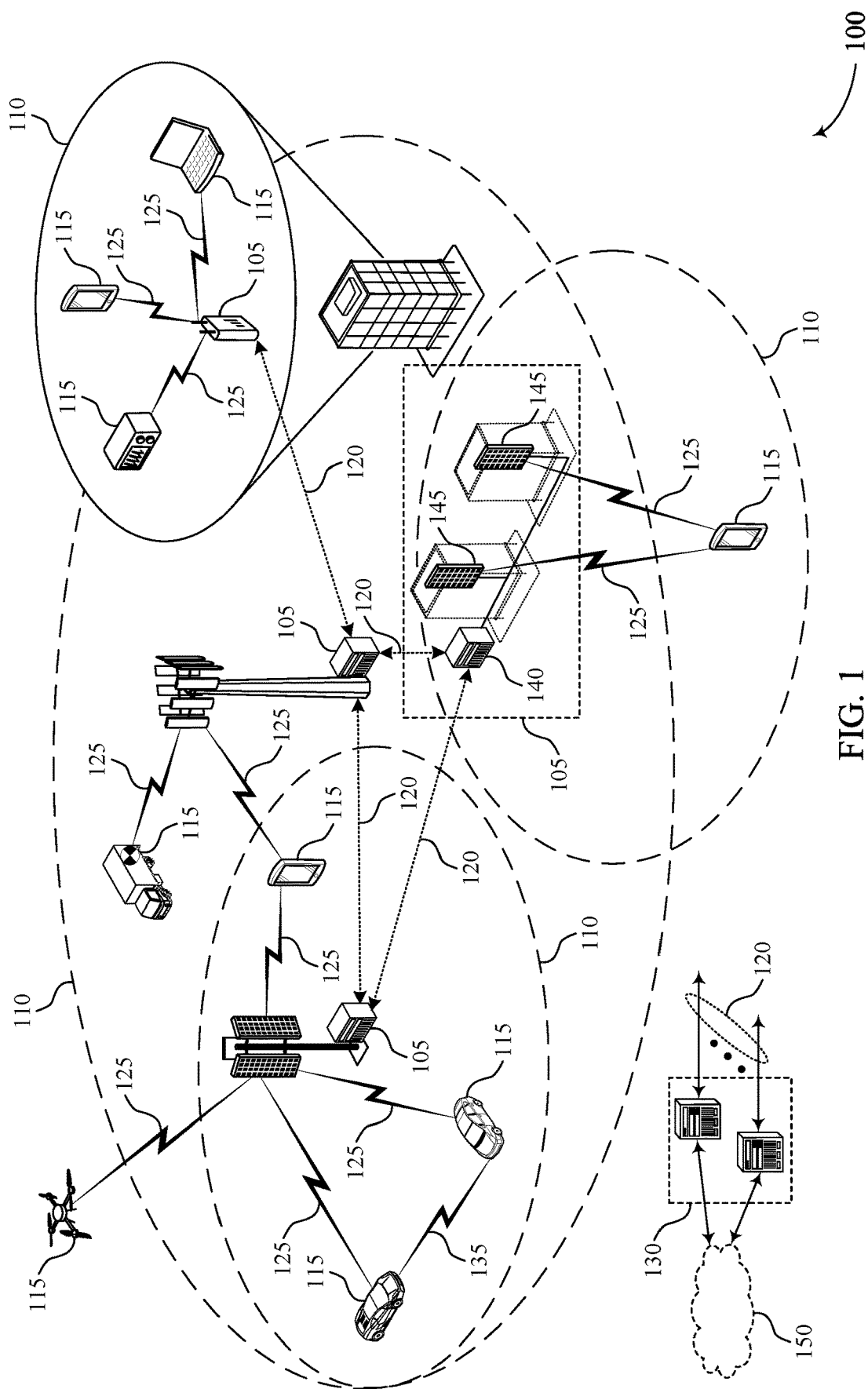
FIG. 1 illustrates an example of a wireless communications system that supports non-coherent wake-up signal in accordance with aspects of the present disclosure.

In some wireless communications, a user equipment (UE) may enter a lower power mode of operation (e.g., connected discontinuous reception cycle (CDRX)) in order to conserve power. During the lower power mode, the UE may operate in a "sleep and wake" cycle, in which the UE may periodically wake to monitor a physical downlink control channel (PDCCH) to identify whether there is traffic waiting to be transmitted to the UE. While monitoring the PDCCH, the UE identifies whether the PDCCH indicates that traffic is waiting to be transmitted to the UE. The UE may activate a baseband component of the UE during each wake cycle to monitor the PDCCH. Accordingly, even when no traffic is waiting to be transmitted to the UE (e.g., subframes with PDCCH only), the UE may utilize the baseband component, leading to high power consumption during the lower power mode. In some cases, higher frequency communications, such as communications in Frequency Range 2 (FR2), may use more power than lower frequency communications, such as communications in Frequency Range 1 (FR1). The higher frequency communications in FR2 use higher bandwidth monitoring during the CDRX cycles, and may use analog-to-digital (ADC) components, which may exhibit high power consumption as compared to components used in lower frequency communications (e.g., FR1). Further, the coherent signals received via the PDCCH may use more intensive signal processing to decode the signals, further increasing power consumption. Accordingly, techniques for improved wake-up signal monitoring, which may reduce complexity and power consumption may be desired.

Systems, devices, and techniques are described reduce power consumption during a lower power mode. A wireless communications system may support a non-coherent wake-up signal (WUS) to reduce UE power consumption when the UE is operating in a lower power mode of operation. Radio resource control (RRC) messages may be exchanged between the UE and a base station (e.g., eNB) in order to determine whether the UE is capable of receiving and/or decoding the non-coherent WUS. In some cases, a UE may include a wake-up component associated with a power source, which may be isolated from a power source associated with a baseband component. During a lower power mode, the wake-up component may be active (e.g., power source associated with wake-up component is active), whereas the baseband component may be inactive (e.g., power source associated with the baseband component may is inactive). The wake-up component may be configured to receive and/or decode a non-coherent WUS and determine, based on the non-coherent WUS, whether the UE is to transition from the lower power mode to a higher power mode in order to receive traffic waiting to be transmitted to the UE. The wake-up component may simplify the digital processing used to process the non-coherent WUS, thereby decreasing power consumption of the lower power mode. Furthermore, by processing the non-coherent WUS with the wake-up component, the UE may avoid activating (e.g., waking up) the more power-intensive baseband component until the non-coherent WUS indicates traffic is waiting to be transmitted to the UE.

Aspects of the disclosure are initially described in the context of wireless communications systems. Aspects of the disclosure are additionally described in the context of an example process flow, an example schematic diagram, and an example UE architecture diagram. Aspects of the disclosure are further illustrated by and described with reference to apparatus diagrams, system diagrams, and flowcharts that relate to non-coherent wake-up signal.

FIG. 1 illustrates an example of a wireless communications system 100 that supports non-coherent wake-up signal in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The quantity of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the quantity of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a quantity of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a quantity of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a lower power mode of operation (e.g., a power saving deep sleep mode when not engaging in active communications), operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a quantity of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured quantity of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may support a non-coherent WUS which may reduce power consumption at a UE 115 when the UE 115 is operating in a lower power mode of operation. In particular, a UE 115 may include a wake-up component associated with a power source, which may be at least partially isolated from a power source associated with a baseband component of the UE 115. In this regard, the wake-up component of the UE 115 may be configured to receive a non-coherent signal, perform signal processing procedures on the non-coherent signal, and identify an indication to transition to the higher power mode of operation to receive traffic without activating (e.g., waking) the more power-intensive baseband component. In some aspects, the wireless communications system 100 may support communications that allow the base stations 105 to determine whether the UEs 115 are capable of receiving and processing the non-coherent signals. For example, a UE 115 may transmit a control message (e.g., RRC message), a UE capability message, or both, to a base station 105, where the control message includes an indication that the UE 115 is capable of receiving and processing a non-coherent signal.

In some aspects, a base station 105 may group one or more UEs 115 of the wireless communications system 100 into a set of UEs 115 that are capable of receiving a non-coherent WUS and are operating in the lower power mode of operation. In cases where the base station 105 identifies traffic waiting to be transmitted to at least one UE 115 of the set of UEs 115, the base station 105 may transmit a non-coherent WUS to the UEs within the set of UEs 115. The non-coherent WUS may include an indication for the UEs 115 to transition to the higher power mode of operation. The non-coherent WUS may further include an indication of a UE 115 associated with the traffic waiting to be transmitted. In this regard, UEs 115 for which the traffic is not intended may transition to a higher power mode of operation, determine that the traffic is not intended for them, and return to the lower power mode of operation. Comparatively, the UE 115 for which the traffic is intended may transition to a higher power mode of operation, determine that the traffic is waiting to be transmitted, and activate a baseband component of the UE 115 in order to receive the traffic.

These techniques may enable the UEs 115 of the wireless communications system 100 to reduce power consumption while operating in a lower power mode of operation. In particular, by processing the non-coherent WUS with a wake-up component that may be associated with a power source that is isolated from a power source associated with a baseband component, the UEs 115 may be able to process the non-coherent WUS without activating (e.g., waking) the more power-intensive baseband component. Moreover, digital processing used to process the non-coherent WUS may be simplified, further decreasing power consumption of the lower power mode.

Figure 2:
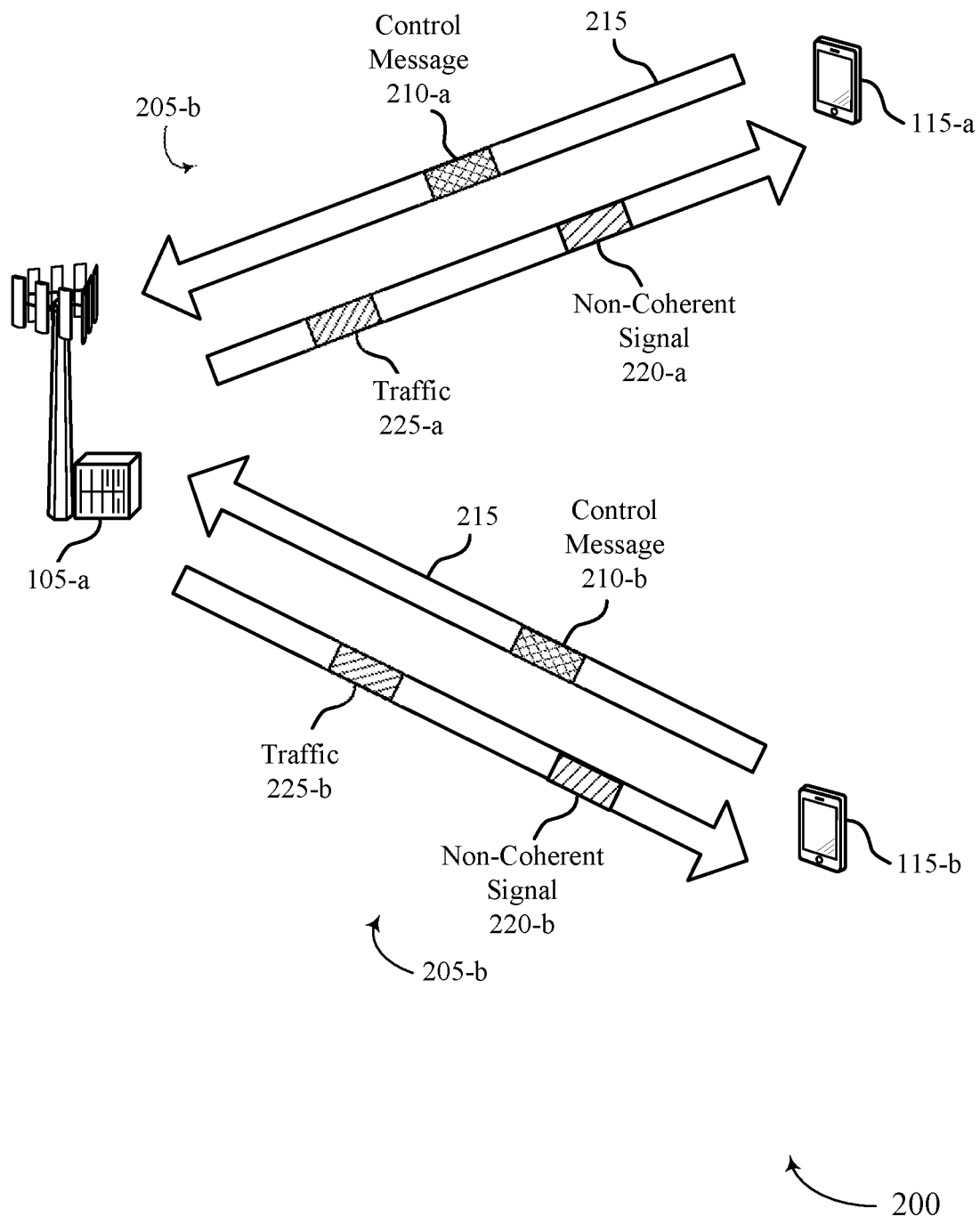
FIG. 2 illustrates an example of a wireless communications system that supports non-coherent wake-up signal in accordance with aspects of the present disclosure.

FIG. 2 illustrates an example of a wireless communications system 200 that supports non-coherent wake-up signal in accordance with aspects of the present disclosure. In some examples, wireless communications system 200 may implement aspects of wireless communications system 100. The wireless communications system 200 may include a base station 105-a, a first UE 115-a, and a second UE 115-b, which may support communications which enable an improved non-coherent WUS.

The first UE 115-a may communicate with the base station 105 using a first communication link 205-a, and the second UE 115-b may communicate with the base station 105 using a second communication link 205-b. In some cases, the first communication link 205-a and the second communication link 205-b may include examples of an access link (e.g., a Uu link). In some cases, the first communication link 205-a and the second communication link 205-b may include examples of a unicast channel between the base station 105 and the first UE 115-a and the second UE 115-b, respectively. The first communication link 205-a and the second communication link 205-b may include a bi-directional link that can include both uplink and downlink communication. For example, the first UE 115-a may transmit uplink transmissions 215, such as uplink control signals or uplink data signals, to the base station 105 using the first communication link 205-a and the base station 105 may transmit downlink transmissions, such as downlink control signals or downlink data signals, to the first UE 115-a using the first communication link 205-a. By way of another example, the second UE 115-b may transmit uplink transmissions 215, such as uplink control signals or uplink data signals, to the base station 105 using the second communication link 205-b and the base station 105 may transmit downlink transmissions, such as downlink control signals or downlink data signals, to the second UE 115-b using the second communication link 205-b.

The UEs 115 and the base stations 105 of the wireless communications system 200 may support communications which provide for a non-coherent WUS which may significantly reduce power consumption at the UEs 115-a and 115-b. In particular, the first UE 115-a and the second UE 115-b may include wake-up components associated with a power source which is at least partially isolated from a power source associated with a baseband component of the respective UEs 115-a and 115-b. In this regard, the wake-up component of the UEs 115-a and 115-b may be configured to receive a non-coherent signal, perform signal processing procedures on the non-coherent signal, and identify an indication to transition to the higher power mode of operation to receive traffic without activating (e.g., waking) the power-intensive baseband components.

In some aspects, a UE 115 may transmit a control message 210 to the base station 105-a, where the control message 210 includes an indication that the UE 115 is configured (e.g., capable, compatible) to receive a non-coherent signal (e.g., non-coherent WUS). The control message may be an example of an RRC message, a UE capability message, or both. For example, the first UE 115-a may transmit a control message 210-*a* to the base station 105-*a* via the communication link 205-*a*, where the control message 210-*a* includes an indication that the first UE 115-*a* is configured to receive a non-coherent signal. Similarly, by way of another example, the second UE 115-*b* may transmit a control message 210-*b* to the base station 105-*a* via the communication link 205-*b*, where the control message 210-*b* includes an indication that the second UE 115-*b* is configurable to receive a non-coherent signal. In some aspects, the UEs 115 may transmit the control messages 210 as part of a configuration procedure (e.g., random access procedure) or attachment procedure with the base station 105-*a*. The base station 105-*a* may determine that the UEs 115 are configured to receive the non-coherent signals based on the respective control messages 210.

In some cases, the UEs 115 of the wireless communications system 200 may be configured to receive one or more types of WUS. For example, the UEs 115 of the wireless communications system 200 may be configured to receive a first type of WUS in addition to, or in the alternative to, the non-coherent WUS. For instance, the UEs 115 may be configured to receive a coherent WUS, a non-coherent WUS, or both. In some cases, the UEs 115 of the wireless communications system 200 may be configured to receive the coherent WUS in the absence of an indication to the contrary. In this regard, the coherent WUS may include a "default" WUS. Accordingly, the UEs 115 may be able to override the default WUS (e.g., the coherent WUS) and activate signaling using the non-coherent WUS by transmitting the control messages 210 to the base station 105-*a*.

The UEs 115 may transition to a lower power mode of operation to conserve power. In some aspects, the lower power mode of operation may include an inactive period of a discontinuous reception cycle (DRX) (e.g., inactive period of a CDRX). During a lower power mode, wake-up components of the UEs 115 may be active (e.g., a first power source associated with wake-up component is active) during one or more portions of the lower power mode, whereas at least a portion of baseband components of the UEs 115 may be inactive (e.g., a second power source associated with the baseband component is inactive). In some cases, the UEs 115 may enter the lower power mode of operation after transmitting the respective control messages 210. In this regard, the first UE 115-*a* may transmit the control message 210-*a* prior to entering the lower power mode, and the second UE 115-*b* may transmit the control message 210-*b* prior to entering the lower power mode.

In some aspects, the base station 105-*a* may identify that the first UE 115-*a*, the second UE 115-*b*, or both, are operating in the lower power mode of operation. The base station 105-*a* may identify traffic waiting to be transmitted to the first UE 115-*a*, the second UE 115-*b*, while either of those UEs are in the lower power mode. In some aspects, the base station 105-*a* may transmit a non-coherent signal 220 (e.g., non-coherent WUS 220) based on identifying traffic waiting to be transmitted. Additionally or alternatively, the base station 105-*a* may transmit the non-coherent signals 220 to the respective UEs 115 based on receiving the control messages 210 from the respective UEs 115. The non-coherent signal 220 may include an indication for the respective UE 115 to transition from the lower power mode to a higher power mode to receive the traffic waiting to be transmitted. In some aspects, the non-coherent signals 220 may be conveyed (e.g., transmitted) over a PDCCH.

For example, the base station 105-*a* may identify that the first UE 115-*a* is operating in the lower power mode of operation, and may additionally identify traffic waiting to be transmitted to the first UE 115-*a*. In such an example, the base station 105-*a* may transmit a non-coherent signal 220-*a* to the first UE 115-*a* while the first UE 115-*a* is operating in the lower power mode. The non-coherent signal 220-*a* may include an indication for the first UE 115-*a* to transition from the lower power mode to a higher power mode to receive the traffic waiting to be transmitted. By way of another example, the base station 105-*a* may identify that the second UE 115-*b* is operating in the lower power mode of operation, and may additionally identify traffic waiting to be transmitted to the second UE 115-*b*. In such an example, the base station 105-*a* may transmit a non-coherent signal 220-*b* to the second UE 115-*b* while the second UE 115-*b* is operating in the lower power mode. The non-coherent signal 220-*b* may include an indication for the second UE 115-*b* to transition from the lower power mode to a higher power mode to receive the traffic waiting to be transmitted. In some aspects, the higher power mode of operation may include an active period of a DRX (e.g., active period of a CDRX).

In some cases, the base station 105-*a* may transmit a non-coherent signal 220 on a per-UE 115 basis. That is, the base station 105-*a* may transmit a non-coherent signal 220 to a given UE 115 each time the base station 105-*a* identifies traffic waiting to be transmitted to the given UE 115. Additionally or alternatively, the base station 105-*a* may group UEs 115 of the wireless communications system 200 into sets of two or more UEs 115 for the purposes of paging. For example, in some cases, the base station 105-*a* may identify that the first UE 115-*a* and the second UE 115-*b* are both configured to receive non-coherent signals 220, and may group the first UE 115-*a* and the second UE 115-*b* into a set of UEs 115. In this example, the base station 105-*a* may transmit the non-coherent signals 220-*a* and 220-*b* to the UEs 115-*a* and 115-*b*, respectively, each time the base station 105-*a* identifies traffic waiting to be transmitted to the first UE 115-*a*, the second UE 115-*b*, or both.

For example, the base station 105-*a* may identify that the set of UEs 115 including the first UE 115-*a* and the second UE 115-*b* are operating in the lower power mode of operation. The base station 105-*a* may subsequently identify traffic waiting to be transmitted to the first UE 115-*a*. In this example, the base station 105-*a* may broadcast the non-coherent signal 220 to the set of UEs (e.g., transmit the first non-coherent signal 220-*a* to the first UE 115-*a* and transmit the second non-coherent signal 220-*b* to the second UE 115-*b*). The base station 105-*a* may transmit the non-coherent signals 220-*a* and 220-*b* to the UEs 115-*a* and 115-*b*, respectively, based on identifying traffic waiting to be transmitted to at least one UE 115 (e.g., the first UE 115-*a*) of the set of UEs 115. In some aspects, the non-coherent signals 220-*a* and 220-*b* may additionally include an identifier associated with the first UE 115-*a* indicating that the traffic is intended for the first UE 115-*a*.

Continuing with the same example, the second UE 115-*b* (e.g., the UE 115 of the set of UEs 115 for which the traffic is not intended) may receive the non-coherent signal 220-*b*, identify an indication to transition to a higher power mode of operation based on the non-coherent signal 220-*b*, and transition to the higher power mode. In this example, the second UE 115-*b* may determine that the traffic was not intended for the second UE 115-*b* based on the identifier associated with the first UE 115-*a*, and may return (e.g., transition) to the lower power mode of operation based on determining that the traffic was not intended for the second UE 115-*b*.

Comparatively, and continuing with the same example, the first UE 115-*a* (e.g., the UE 115 of the set of UEs 115 for which the traffic is intended) may receive the non-coherent signal 220-a, identify an indication to transition to a higher power mode of operation based on the non-coherent signal 220-a, and transition to the higher power mode. In this example, the first UE 115-a may determine that the traffic is intended for the first UE 115-a based on the identifier associated with the first UE 115-a. In this example, the first UE 115-a may remain in the higher power mode in order to receive the traffic waiting to be transmitted to the first UE 115-a from the base station 105-a.

In some aspects, the first UE 115-a may receive the non-coherent signal 220-a, and may identify the indication to transition from the lower power mode to the higher power mode with a wake-up component associated with a first power source of the first UE 115-a that is isolated from a second power source associated with a baseband component of the first UE 115-a. In some aspects, the wake-up component may include a processor, a field-programmable gate array (FPGA), an application-specific integrated circuit (ASIC), a digital signal processor (DSP), or any combination thereof.

In some aspects, the first UE 115-a (e.g., the wake-up component of the first UE 115-a) may identify, within the non-coherent signal 220-a, a first resource element and a second resource element. The wake-up component of the first UE 115-a may perform one or more differential decoding operations on the first resource element and the second resource in order to identify the indication to transition from the lower power mode to the higher power mode. For example, the wake-up component of the first UE 115-a may perform one or more differential decoding operations on the first resource element and the second resource element to generate an indicator value. In some aspects, the indicator value may include, but is not limited to, a logarithm likelihood ratio (LLR) value. In this example, the wake-up component may determine the indication to transition from the lower power mode to the higher power mode based on the indicator value. The wake-up component may then activate the baseband component of the first UE 115-a and cause the first UE 115-a to enter the higher power mode based on identifying the indication.

In some aspects, the wake-up component of the first UE 115-a may be configured to perform the one or more differential decoding operations by identifying a first OFDM symbol and a second OFDM symbol within the non-coherent signal 220-a. In some cases, the second OFDM symbol may immediately precede the first OFDM symbol. Upon identifying the first OFDM symbol and the second OFDM symbol, the wake-up component may remove a cyclic prefix of the respective OFDM symbols to retrieve (e.g., generate) the respective resource elements. For example, the wake-up component may remove a first cyclic prefix from the first OFDM symbol to retrieve the first resource element, and may remove a second cyclic prefix from the second OFDM symbol to retrieve the second resource element. The wake-up component of the first UE 115-a may then perform the one or more differential decoding operations by multiplying the first resource element by a conjugate of the second resource element to generate the indicator value. In some cases, the second resource element may immediately precede the first resource element. In this regard, the wake-up component of the first UE 115-a may be configured to perform the one or more differential decoding by multiplying the first resource element by the conjugate of its predecessor. The wake-up component may then determine the indication to transition from the lower power mode to the higher power mode based on the indicator value, and may activate the baseband component of the first UE 115-a and cause the first UE 115-a to enter the higher power mode based on identifying the indication.

The signal processing complexity for processing the non-coherent signals 220 may be reduced as compared to the processing used for some other WUSs. In particular, the signal processing of the non-coherent signal 220 may include a simplified de-mapper in which the first resource element is multiplied by the conjugate of its predecessor. Additionally, channel estimation may not be used for modulating or demodulating the non-coherent signal 220, thereby reducing processing and memory complexity and reducing power consumption. Without channel estimation, the techniques described herein may reduce or eliminate buffering for signal processing, thereby reducing latency and power consumption. This latency reduction in PDCCH decoding may increase the efficiency of the lower power mode when no data is allocated for the UE 115 (e.g., when no traffic is waiting for the UE 115). Furthermore, as compared to de-mapping with a coherent WUS, processing of the non-coherent signal 220 may not use signal equalization, further reducing power consumption at the UE 115. Taken together, the techniques described herein may significantly reduce the complexity and processing used for processing the non-coherent signal 220, thereby reducing power consumption at the UE 115 and improving the power saving efficiency of the lower power mode of operation.

Figure 3:
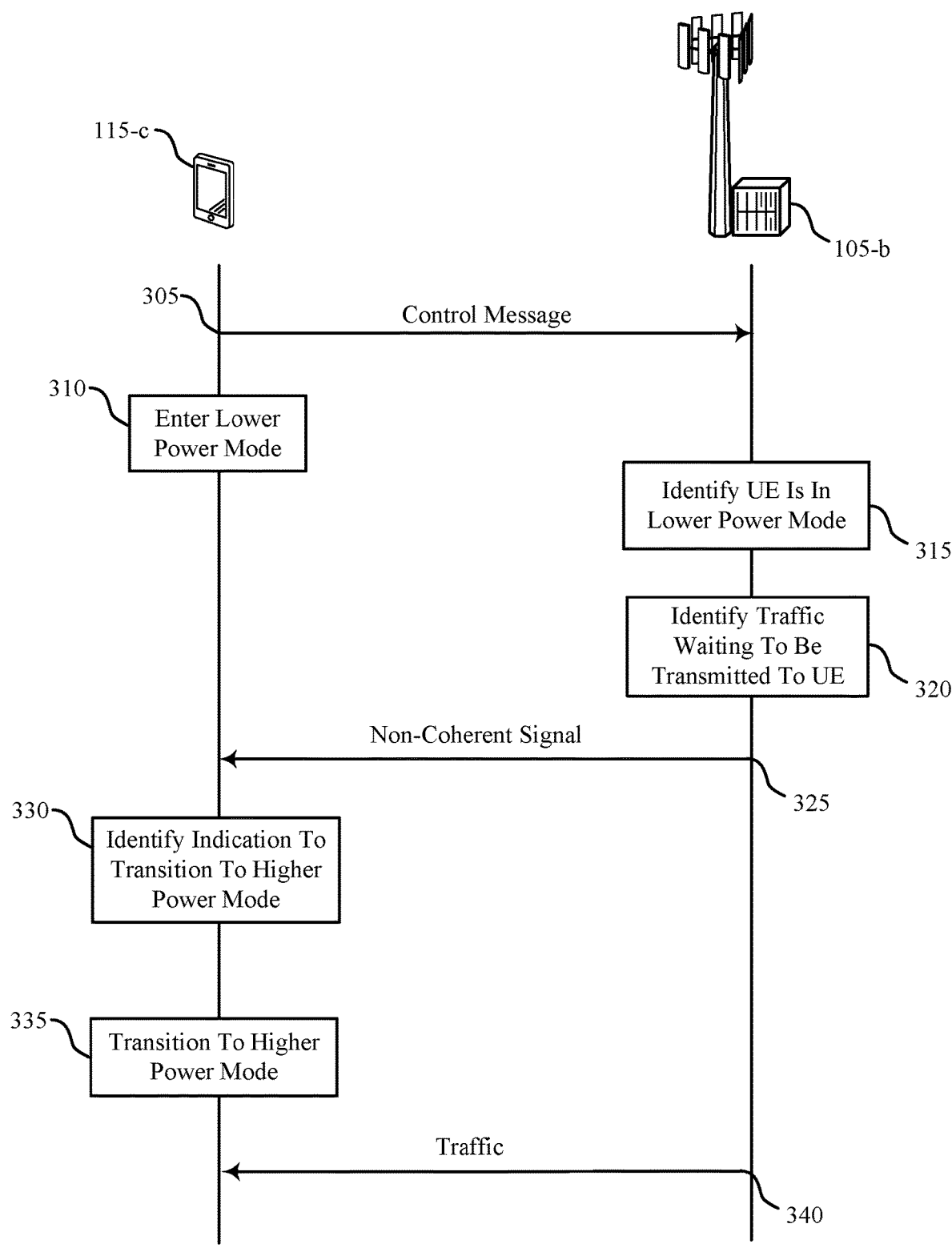
FIG. 3 illustrates an example of a process flow that supports non-coherent wake-up signal in accordance with aspects of the present disclosure.

FIG. 3 illustrates an example of a process flow 300 that supports non-coherent wake-up signal in accordance with aspects of the present disclosure. In some examples, process flow 300 may implement, or be implemented by, aspects of wireless communications systems 100 or 200. For example, the process flow 300 may illustrate receiving a non-coherent signal while in a lower power mode of operation, identifying an indication to transition to a higher power mode of operation based on the non-coherent signal, and transitioning to the higher power mode of operation in order to receive traffic, as described with reference to FIGS. 1-2, among other aspects.

In some cases, process flow 300 may be related to or be performed by a UE 115-c, a base station 105-b, or any combination thereof, which may be examples of corresponding devices as described herein. In particular, the UE 115-c and base station 105-b illustrated in FIG. 3 may include examples of the first UE 115-a, the second UE 115-b, and the base station 105-a illustrated in FIG. 2

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the UE 115-c may transmit a control message to the base station 105-b, where the control message includes an indication that the UE 115-c is configured (e.g., capable, compatible) to receive a non-coherent signal (e.g., non-coherent WUS). The control message may include an RRC message, a UE capability message, or both. In some aspects, the UE 115-c may transmit the control message as part of a configuration procedure (e.g., random access procedure) or attachment procedure with the base station 105-b. In some aspects, the base station 105-b may determine that the UE 115-*c* is configured to receive the non-coherent signals based on the control message received at 305.

In some cases, the UE **115-*c* may be configured to receive one or more types of WUSs. For example, the UE 115-*c* may be configured to receive a first type of WUS in addition to, or in the alternate to, the non-coherent WUS. For instance, the UE 115-*c* may be configured to receive a coherent WUS, the non-coherent WUS, or both. In some cases, the UE 115-*c* may be configured to receive the coherent WUS in the absence of an indication to the contrary. In this regard, the coherent WUS may include a "default" WUS. Accordingly, the UE 115-*c* may be able to override the default WUS (e.g., the coherent WUS) and activate signaling using the non-coherent WUS by transmitting the control message to the base station 105-*c* at 305**.

At 310, the UE **115-*c* may enter the lower power mode of operation. The UE 115-*c* may enter to the lower power mode of operation in order to conserve power. In some aspects, the lower power mode of operation may include an inactive period of a DRX (e.g., inactive period of a CDRX). During the lower power mode, a wake-up component of the UE 115-*c* may be active (e.g., a first power source associated with wake-up component is active) or may be activated periodically, whereas a baseband component of the UE 115-*c* may be inactive (e.g., a second power source associated with the baseband component may is inactive). In some aspects, the UE 115-*c* may enter the lower power mode of operation based on, and subsequent to, transmitting the control message at 305. In this regard, the UE 115-*c* may transmit the control message at 305 prior to entering the lower power mode at 310**.

At 315, the base station **105-*b* may identify that the UE 115-*c* is operating in the lower power mode of operation. In some aspects, the base station 105-*b* may identify that the UE 115-*c* is operating in the lower power mode of operation based on signaling received from the UE 115-*c*. For example, the UE 115-*c* may transmit one or more messages to the base station 105-*b*, where the one or messages include an indication that the UE 115-*c*** is entering the lower power mode of operation.

At 320, the base station **105-*b* may identify traffic waiting to be transmitted to the UE 115-*c*. Additionally or alternatively, the base station 105-*b* may identify traffic waiting to be transmitted to at least one UE 115 of a set of UEs 115 which include the UE 115-*c*. For example, in some cases, the UE 115-*c* may be included in a set of UEs 115 for the purposes of paging. In this example, at 320, the base station 105-*b* may identify traffic waiting to be transmitted to the UE 115-*c*, an additional UE 115** of the set of UEs, or both.

At 325, the base station **105-*b* may transmit a non-coherent signal (e.g., non-coherent WUS) to the UE 115-*c*. In some aspects, the non-coherent signal may include an indication for the UE 115-*c* to transition from the lower power mode to a higher power mode. The non-coherent signal may additionally include an identifier associated with the UE 115-*c*. The base station 105-*c* may transmit the non-coherent signal to the UE 115-*c* while the UE 115-*c* is in the lower power mode of operation. In some aspects, the base station 105-*c* may transmit the non-coherent signal to the UE 115-*c* based on identifying the UE 115-*c* is in the lower power mode of operation at 315, identifying traffic waiting to be transmitted to the UE 115-*c* at 320, or any combination thereof. The UE 115-*c* may receive the non-coherent signal at 325** via a PDCCH.

In some aspects, the base station **105-*b* may transmit the non-coherent signal to the UE 115-*c* each time the base station 105-*b* identifies data to be transmitted to the UE 115-*c* when the UE 115-*c* in in the lower power mode. Additionally or alternatively, the base station 105-*b* may transmit the non-coherent signal to a set of UEs 115 including the UE 115-*c* each time the base station 105-*b* identifies data to be transmitted to at least one UE 115 of the set of UEs 115. For example, in some cases, the base station 105-*b* may identify that the UE 115-*c* and an additional UE 115 are both configured to receive non-coherent signals, and may group the UE 115-*c* and the additional UE 115 into a set of UEs 115. In this example, the base station 105-*b* may transmit the non-coherent signals at 325 to the to the UE 115-*c* and the additional UE 115 each time the base station 105-*b* identifies traffic waiting to be transmitted to the UE 115-*c*, the additional UE 115**, or both.

At 330, the UE **115-*c* may identify an indication to transition from the lower power mode to the higher power mode. In some aspects, the UE 115-*c* may identify the indication to transition from the lower power mode to the higher power mode based on receiving the non-coherent signal. Additionally, the UE 115-*c* may identify the indication to transition from the lower power mode to the higher power mode based on the indication of the identifier associated with the UE 115-*c*** within the non-coherent signal.

In some aspects, a wake-up component associated with a first power source of UE **115-*c* that is isolated from a second power source associated with a baseband component of the UE 115-*c*** may identify the indication to transition from the lower power mode to the higher power mode based at least in part on receiving the non-coherent signal. The wake-up component may include, but is not limited to, a processor, an FPGA, an ASIC, a DSP, or any combination thereof.

In some aspects, the UE **115-*c* (e.g., the wake-up component of the UE 115-*c*) may identify, within the non-coherent signal, a first resource element and a second resource element. The wake-up component of the UE 115-*c*** may perform one or more differential decoding operations on the first resource element and the second resource in order to identify the indication to transition from the lower power mode to the higher power mode. For example, the wake-up component may perform one or more differential decoding operations on the first resource element and the second resource element to generate an indicator value. In this example, the wake-up component may determine the indication to transition from the lower power mode to the higher power mode based on the indicator value.

At 335, the UE **115-*c* may transition from the lower power mode of operation to the higher power mode of operation. In some aspects, the UE 115-*c* may transition from to the higher power mode based on receiving the non-coherent signal at 325, identifying the indication to transition to the higher power mode at 330, or any combination thereof. In some aspects, the wake-up component of the UE 115-*c* may activate the baseband component of the UE 115-*c* and cause the UE 115-*c*** to enter the higher power mode.

At 340, the UE **115-*c* may receive the traffic from the base station 105-*b*. In some aspects, the UE 115-*c* may receive the traffic via a downlink channel (e.g., a downlink channel of a communications link 205 illustrated in FIG. 2). For example, the UE 115-*c*** may receive the traffic via a physical downlink shared channel (PDSCH).

Figure 4:
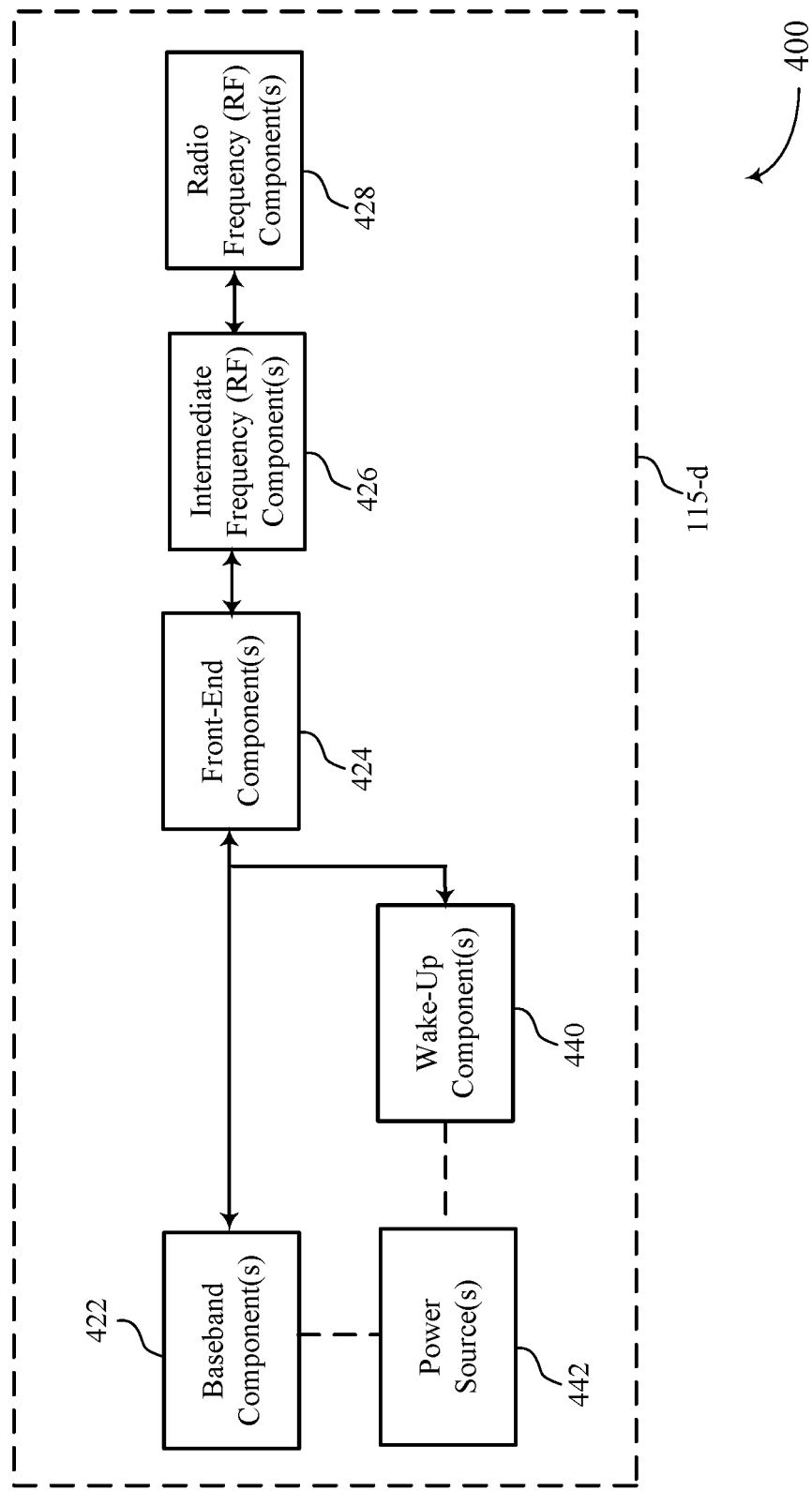
FIG. 4 illustrates an example of a schematic diagram that supports non-coherent wake-up signal in accordance with aspects of the present disclosure.

FIG. 4 illustrates an example of a schematic diagram 400 that supports non-coherent wake-up signal in accordance with aspects of the present disclosure. In some examples, schematic diagram 400 may implement aspects of wireless communications systems 100 or 200, process flow 300, or any combination thereof. The schematic diagram 400 may illustrate example components of a UE **115-*d*** that is enabled to receive non-coherent signals (e.g., non-coherent WUS). For example, a UE 115 may include, but is not limited to, one or more radio frequency (RF) components 428, one or more intermediate frequency (IF) components 426, one or more front-end components 424, a wake-up component 440, a baseband component 422, and one or more power sources 442.

In some aspects, the RF component 428 may be coupled with the wake-up component 440 and the baseband component 422, and may be configured to transmit and receive signals from a base station 105. The baseband component 422 may be configured to perform one or more signal processing procedures or operations on signals received from the base station 105. In some aspects, the wake-up component 440 may be coupled with the various components illustrated in the schematic diagram 400. The wake-up component 440 may be associated with (e.g., coupled with) a first power source of the UE 115-d that is different than a second power source which is associated with (e.g., coupled to) the baseband component 422. Additionally or alternatively, the wake-up component 440 and the baseband component 422 may be coupled to one or more power sources 442, which may be configured to independently operate (e.g., power) the wake-up component 440 and the baseband component 422 separately from one another. The power source 442 may represent one or more separate power sources or power islands. Different components may be coupled with different power sources or power islands so that they may be operated somewhat independently. For example, the wake-up component 540 may be coupled with a first power source of the power sources 442 and the baseband component 422 may be coupled with a second power source of the power sources 442 that is different than the first power source. In such a manner, the wake-up component 440 may be activated or operated independently from the baseband component 422.

In some aspects, the RF component 428 may be configured to transmit uplink transmissions (e.g., signals, messages) to a base station 105, and receive downlink transmissions (e.g., signals, messages, traffic) from the base station 105. The RF component 428 may include one or more antennas, one or more phased array antennas, other circuitry, or a combination thereof. In some aspects, the RF component 428 may transmit a control message (e.g., RRC message, UE capability message) to the base station 105, where the control message includes an indication that the UE 115-d is configured (e.g., capable, compatible) to receive a non-coherent signal (e.g., non-coherent WUS).

In some aspects, the UE 115-d may enter a lower power mode of operation. In some aspects, the UE 115-d may enter the lower power mode of operation after transmitting the control message to the base station 105 in order to conserve power. In some aspects, the lower power mode of operation may include an inactive period of a DRX (e.g., inactive period of a CDRX). During a lower power mode, the wake-up component 440 of the UE 115-d may be active (e.g., a first power source associated with wake-up component 440 is active), whereas at least a portion of the baseband component 422 of the UE 115-d may be inactive (e.g., a second power source associated with the baseband component 422 is inactive). In some examples, the wake-up component 440 may be implemented on a separate "power island" than a "power island" associated with the baseband component 422. In some cases, having the wake-up component 440 be implemented as a separate power island may enable the UE to activate the wake-up component 440 without activating the baseband component 422.

The RF component 428 may receive a non-coherent signal (e.g., non-coherent WUS) from the base station 105 while the UE 115-d is operating in the lower power mode. In some aspects, the RF component 428 may receive the non-coherent signal based on transmitting the control message including the indication that the UE 115-d is capable of receiving non-coherent signals. The non-coherent signal may include an indication for the UE 115-d to transition from the lower power mode to a higher power mode. The non-coherent signal may further include an indicator associated with the UE 115-d indicating that traffic waiting to be transmitted is intended for the UE 115-d.

In some aspects, the non-coherent signal received by the RF component 428 may be shifted to an intermediate frequency by the IF component 426. In some aspects, the RF component 428 and the IF component 426 may provide reduced integrated phase noise requirements in the context of non-coherent signals as compared to receiving other types of signals (e.g., coherent WUS). Moreover, the RF component 428 and the IF component of the UE 115-d may exhibit reduced linearity requirements, as well as reduced anti-aliasing filtering (AAF) selectivity as compared to other UE 115 configurations for receiving other types of signals (e.g., coherent WUS). The front-end components 424 may perform one or more signal processing operations on the received non-coherent signal. The front-end components 424 may include any signal processing components including, but not limited to, filters (e.g., spur filters, decimation filters), amplifiers, mixers, phase shifters, ADC components, other circuitry or components, or any combination thereof.

While operating in the lower power mode of operation, the wake-up component 440 may receive the non-coherent signal after it is processed by the RF component 428, the IF component 426, and the front-end components 424, and may identify an indication to transition from the lower power mode to the higher power mode based on the non-coherent signal. In some aspects, the wake-up component 440 of the UE 115-d may identify, within the non-coherent signal, a first resource element and a second resource element. The wake-up component 440 may perform one or more differential decoding operations on the first resource element and the second resource in order to identify the indication to transition from the lower power mode to the higher power mode. For example, the wake-up component 440 may perform one or more differential decoding operations on the first resource element and the second resource element to generate an indicator value. In some aspects, the indicator value may include, but is not limited to, an LLR value. In this example, the wake-up component 440 may determine the indication to transition from the lower power mode to the higher power mode based on the indicator value. The wake-up component 440 may then activate at least a portion of the baseband component 422 of the UE 115-d and cause the first UE 115-d to enter the higher power mode based on identifying the indication.

In some aspects, the wake-up component 440 may be configured to perform the one or more differential decoding operations by identifying a first OFDM symbol and a second OFDM symbol within the non-coherent signal. In some cases, the second OFDM symbol may immediately precede the first OFDM symbol. Upon identifying the first OFDM symbol and the second OFDM symbol, the wake-up component 440 may remove a cyclic prefix of the respective OFDM symbols to retrieve (e.g., generate) the respective resource elements. For example, the wake-up component 440 may remove a first cyclic prefix from the first OFDM symbol to retrieve the first resource element, and may remove a second cyclic prefix from the second OFDM symbol to retrieve the second resource element. The wake-up component 440 may then perform the one or more differential decoding operations by multiplying the first resource element by a conjugate of the second resource element to generate the indicator value. In some cases, the second resource element may immediately precede the first resource element. In this regard, the wake-up component 440 may be configured to perform the one or more differential decoding by multiplying the first resource element by the conjugate of its predecessor. The wake-up component 440 may then determine the indication to transition from the lower power mode to the higher power mode based on the indicator value, and may activate at least a portion of the baseband component 422 of the UE 115-*d* and cause the first UE 115-*d* to enter the higher power mode based on identifying the indication.

Upon transitioning to the higher power mode and activating at least a portion of the baseband component 422, the RF component 428 may receive traffic which may be waiting to be transmitted to the UE 115-*d* from the base station 105. In this regard, the UE 115-*d* may receive a downlink transmission (e.g., downlink signal, downlink message) including the traffic. The downlink transmission including the traffic may be received by the RF component 428, and shifted to an intermediate frequency for processing and handling by the IF component 426. In some cases, the front-end components 424 may perform one or more signal processing operations on the received downlink transmission. Subsequently, the baseband component 422 may receive the downlink transmission including the traffic, and perform one or more signal processing procedures or operations on the downlink transmission.

The techniques and configuration of the UE 115-*d* illustrated by the schematic diagram 400 may significantly reduce the complexity used to process the non-coherent signals, as compared to the processing used for some other WUS. In particular, the signal processing of the non-coherent signal may include a simplified de-mapper in which the first resource element is multiplied by the conjugate of its predecessor. Additionally, channel estimation may not be required for modulating or demodulating the non-coherent signal, thereby reducing processing and memory complexity and reducing power consumption. Without channel estimation, the techniques described herein may reduce or eliminate buffering used for signal processing, thereby reducing latency and power consumption. This latency reduction in PDCCH decoding may increase the efficiency of the lower power mode when no data is allocated for the UE 115-*d* (e.g., when no traffic is waiting for the UE 115-*d*). Furthermore, as compared to de-mapping with a coherent WUS, processing of the non-coherent signal may not use signal equalization, further reducing power consumption at the UE 115-*d*. Taken together, the techniques described herein may significantly reduce the complexity and processing used for processing the non-coherent signal, thereby reducing power consumption at the UE 115-*d* and improving the power saving efficiency of the lower power mode of operation.

Figure 5:
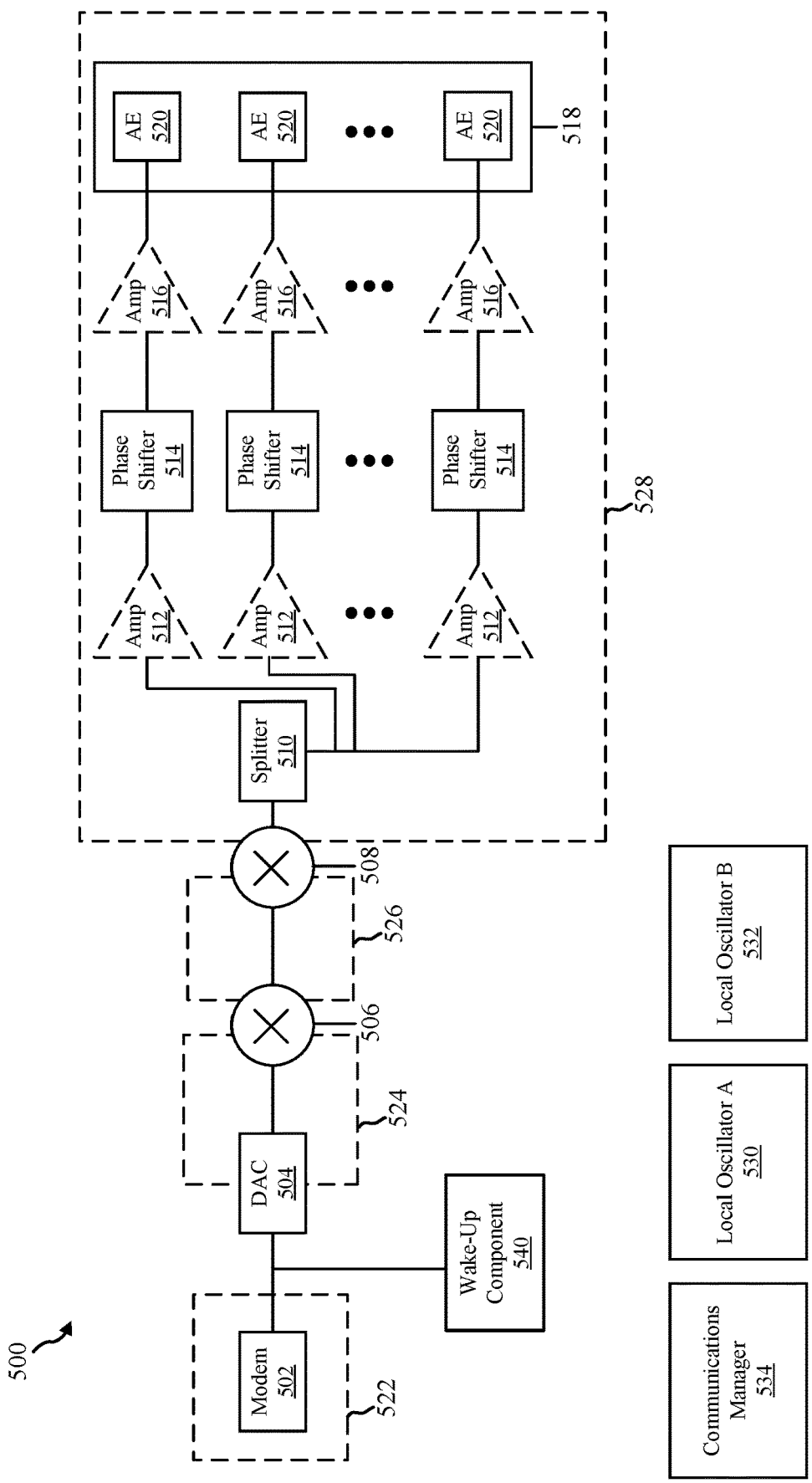
FIG. 5 illustrates an example of an architecture diagram that supports non-coherent wake-up signal in accordance with aspects of the present disclosure.

FIG. 5 illustrates an example of an architecture diagram 500 that supports non-coherent wake-up signal in accordance with aspects of the present disclosure. In some examples, architecture diagram 500 may implement aspects of wireless communications systems 100 or 200, process flow 300, schematic diagram 400, or any combination thereof. In some aspects, diagram 500 may be an example of the transmitting device (e.g., a first wireless device, UE 115, or base station 105) and/or a receiving device (e.g., a second wireless device, UE 115, or base station 105) as described herein. For example, the architecture diagram 500 illustrated in FIG. 5 may illustrate an example architecture of a UE 115 which is enabled to receive and process non-coherent signals (e.g., non-coherent WUS).

Broadly, FIG. 5 is a diagram illustrating example hardware components of a wireless device in accordance with certain aspects of the disclosure. The illustrated components may include those that may be used for antenna element selection and/or for beamforming for transmission of wireless signals. There are numerous architectures for antenna element selection and implementing phase shifting, only one example of which is illustrated here. The architecture diagram 500 includes a modem (modulator/demodulator) 502, a digital to analog converter (DAC) 504, a first mixer 506, a second mixer 508, and a splitter 510. The architecture diagram 500 also includes a plurality of first amplifiers 512, a plurality of phase shifters 514, a plurality of second amplifiers 516, and an antenna array 518 that includes a plurality of antenna elements 520. Transmission lines or other waveguides, wires, traces, or the like are shown connecting the various components to illustrate how signals to be transmitted may travel between components. Boxes 522, 524, 526, and 528 indicate regions in the architecture diagram 500 in which different types of signals travel or are processed. Specifically, box 522 indicates a region in which digital baseband signals travel or are processed, box 524 indicates a region in which analog baseband signals travel or are processed, box 526 indicates a region in which analog IF signals travel or are processed, and box 528 indicates a region in which analog RF signals travel or are processed. The architecture also includes a local oscillator 530, a local oscillator 532, and a communications manager 534.

In some aspects, the box 528 may illustrate an example configuration of the RF component 428 shown and described in FIG. 4. Similarly, the box 526 may illustrate an example configuration of the IF component 426, the box 524 may illustrate an example configuration of the front-end components 424, and the wake-up component 540 may be an example of the wake-up component 440, and the box 522 may illustrate an example configuration of the baseband component 422 or the baseband component 422 may be part of the components that are illustrated by box 522, as shown and described with reference to FIG. 4.

Each of the antenna elements 520 may include one or more sub-elements (not shown) for radiating or receiving RF signals. For example, a single antenna element 520 may include a first sub-element cross-polarized with a second sub-element that can be used to independently transmit cross-polarized signals. The antenna elements 520 may include patch antennas or other types of antennas arranged in a linear, two dimensional, or other pattern. A spacing between antenna elements 520 may be such that signals with a desired wavelength transmitted separately by the antenna elements 520 may interact or interfere (e.g., to form a desired beam). For example, given an expected range of wavelengths or frequencies, the spacing may provide a quarter wavelength, half wavelength, or other fraction of a wavelength of spacing between neighboring antenna elements 520 to allow for interaction or interference of signals transmitted by the separate antenna elements 520 within that expected range.

The modem 502 processes and generates digital baseband signals and may also control operation of the DAC 504, first and second mixers 506, 508, splitter 510, first amplifiers 512, phase shifters 514, and/or the second amplifiers 516 to transmit signals via one or more or all of the antenna elements 520. The modem 502 may process signals and control operation in accordance with a communication standard such as a wireless standard discussed herein. The DAC 504 may convert digital baseband signals received from the modem 502 (and that are to be transmitted) into analog baseband signals. The first mixer 506 upconverts analog baseband signals to analog IF signals within an IF using a local oscillator A 530. For example, the first mixer 506 may mix the signals with an oscillating signal generated by the local oscillator A 530 to "move" the baseband analog signals to the IF. In some cases, some processing or filtering (not shown) may take place at the IF. The second mixer 508 upconverts the analog IF signals to analog RF signals using the local oscillator B 532. Similarly to the first mixer, the second mixer 508 may mix the signals with an oscillating signal generated by the local oscillator 532 to "move" the IF analog signals to the RF, or the frequency at which signals will be transmitted or received. The modem 502 and/or the communications manager 534 may adjust the frequency of local oscillator A 530 and/or the local oscillator 532 so that a desired IF and/or RF frequency is produced and used to facilitate processing and transmission of a signal within a desired bandwidth.

In the illustrated architecture diagram 500, signals upconverted by the second mixer 508 are split or duplicated into multiple signals by the splitter 510. The splitter 510 in architecture diagram 500 splits the RF signal into a plurality of identical or nearly identical RF signals, as denoted by its presence in box 528. In other examples, the split may take place with any type of signal including with baseband digital, baseband analog, or IF analog signals. Each of these signals may correspond to an antenna element 520 and the signal travels through and is processed by amplifiers 512, 516, phase shifters 514, and/or other elements corresponding to the respective antenna element 520 to be provided to and transmitted by the corresponding antenna element 520 of the antenna array 518. In one example, the splitter 510 may be an active splitter that is connected to a power supply and provides some gain so that RF signals exiting the splitter 510 are at a power level equal to or greater than the signal entering the splitter 510. In another example, the splitter 510 is a passive splitter that is not connected to power supply and the RF signals exiting the splitter 510 may be at a power level lower than the RF signal entering the splitter 510.

After being split by the splitter 510, the resulting RF signals may enter an amplifier, such as a first amplifier 512, or a phase shifter 514 corresponding to an antenna element 520. The first and second amplifiers 512, 516 are illustrated with dashed lines because one or both of them might not be necessary in some implementations. In one implementation, both the first amplifier 512 and second amplifier 516 are present. In another, neither the first amplifier 512 nor the second amplifier 516 is present. In other implementations, one of the two amplifiers 512, 516 is present but not the other. By way of example, if the splitter 510 is an active splitter, the first amplifier 512 may not be used. By way of further example, if the phase shifter 514 is an active phase shifter that can provide a gain, the second amplifier 516 might not be used. The amplifiers 512, 516 may provide a desired level of positive or negative gain. A positive gain (positive dB) may be used to increase an amplitude of a signal for radiation by a specific antenna element 520. A negative gain (negative dB) may be used to decrease an amplitude and/or suppress radiation of the signal by a specific antenna element. Each of the amplifiers 512, 516 may be controlled independently (e.g., by the modem 502 or the communications manager 534) to provide independent control of the gain for each antenna element 520. For example, the modem 502 and/or the communications manager 534 may have at least one control line connected to each of the splitter 510, first amplifiers 512, phase shifters 514, and/or second amplifiers 516 which may be used to configure a gain to provide a desired amount of gain for each component and thus each antenna element 520.

The phase shifter 514 may provide a configurable phase shift or phase offset to a corresponding RF signal to be transmitted. The phase shifter 514 could be a passive phase shifter not directly connected to a power supply. Passive phase shifters might introduce some insertion loss. The second amplifier 516 could boost the signal to compensate for the insertion loss. The phase shifter 514 could be an active phase shifter connected to a power supply such that the active phase shifter provides some amount of gain or prevents insertion loss. The settings of each of the phase shifters 514 are independent meaning that each can be set to provide a desired amount of phase shift or the same amount of phase shift or some other configuration. The modem 502 and/or the communications manager 534 may have at least one control line connected to each of the phase shifters 514 and which may be used to configure the phase shifters 514 to provide a desired amounts of phase shift or phase offset between antenna elements 520.

The architecture diagram 500 is given by way of example only to illustrate an architecture for transmitting and/or receiving signals. It will be understood that the architecture diagram 500 and/or each portion of the architecture diagram 500 may be repeated multiple times within an architecture to accommodate or provide an arbitrary quantity of RF chains, antenna elements, and/or antenna panels. Furthermore, numerous alternate architectures are possible and contemplated. For example, although only a single antenna array 518 is shown, two, three, or more antenna arrays may be included each with one or more of their own corresponding amplifiers, phase shifters, splitters, mixers, DACs, ADCs, and/or modems. For example, a single UE may include two, four or more antenna arrays for transmitting or receiving signals at different physical locations on the UE or in different directions. Furthermore, mixers, splitters, amplifiers, phase shifters and other components may be located in different signal type areas (e.g., different ones of the boxes 522, 524, 526, 528) in different implemented architectures. For example, a split of the signal to be transmitted into a plurality of signals may take place at the analog RF, analog IF, analog baseband, or digital baseband frequencies in different examples. Similarly, amplification, and/or phase shifts may also take place at different frequencies. For example, in some contemplated implementations, one or more of the splitter 510, amplifiers 512, 516, or phase shifters 514 may be located between the DAC 504 and the first mixer 506 or between the first mixer 506 and the second mixer 508. In one example, the functions of one or more of the components may be combined into one component. For example, the phase shifters 514 may perform amplification to include or replace the first and/or or second amplifiers 512, 516. By way of another example, a phase shift may be implemented by the second mixer 508 to reduce or eliminate the need for a separate phase shifter 514. This technique is sometimes called local oscillator (LO) phase shifting. In one implementation of this configuration, there may be a plurality of IF to RF mixers (e.g., for each antenna element chain) within the second mixer 508 and the local oscillator 532 would supply different local oscillator signals (with different phase offsets) to each IF to RF mixer.

The modem 502 and/or the communications manager 534 may control one or more of the other components of the architecture diagram 500 to select one or more antenna elements 520 and/or to form beams for transmission of one or more signals. For example, the antenna elements 520 may be individually selected or deselected for transmission of a signal (or signals) by controlling an amplitude of one or more corresponding amplifiers, such as the first amplifiers 512 and/or the second amplifiers 516. Beamforming includes generation of a beam using a plurality of signals on different antenna elements where one or more or all of the plurality signals are shifted in phase relative to each other. The formed beam may carry physical or higher layer reference signals or information. As each signal of the plurality of signals is radiated from a respective antenna element 520, the radiated signals interact, interfere (constructive and destructive interference), and amplify each other to form a resulting beam. The shape (such as the amplitude, width, and/or presence of side lobes) and the direction (such as an angle of the beam relative to a surface of the antenna array 518) can be dynamically controlled by modifying the phase shifts or phase offsets imparted by the phase shifters 514 and amplitudes imparted by the amplifiers 512, 516 of the plurality of signals relative to each other.

The communications manager 534 may, when architecture diagram 500 is configured as a receiving device, transmit a first beam measurement report to a first wireless device, the first beam measurement report indicating a first set of beam measurements for a wireless channel between the first wireless device and the second wireless device. The communications manager 534 may receive from the first wireless device a cluster validity metric for at least one beam in the first beam measurement report. The communications manager 534 may transmit to the first wireless device a second beam measurement report based at least in part on the cluster validity metric, the second beam measurement report indicating a second set of beam measurements for the wireless channel, as discussed herein. The communications manager 534 may, when architecture diagram 500 is configured as a transmitting device, receive a first beam measurement report from a second wireless device, the first beam measurement report indicating a first set of beam measurements for a wireless channel between the first wireless device and the second wireless device. The communications manager 534 may transmit to the second wireless device a cluster validity metric for at least one beam in the first beam measurement report. The communications manager 534 may receive from the second wireless device, in response to transmitting the cluster validity metric, a second beam measurement report indicating a second set of beam measurements for the wireless channel. The communications manager 534 may select a beam for transmitting to the second wireless device based at least in part on the first and second beam measurement reports, as discussed herein. The communications manager 534 may be located partially or fully within one or more other components of the architecture diagram 500. For example, the communications manager 534 may be located within the modem 502 in at least one implementation.

Figure 6:
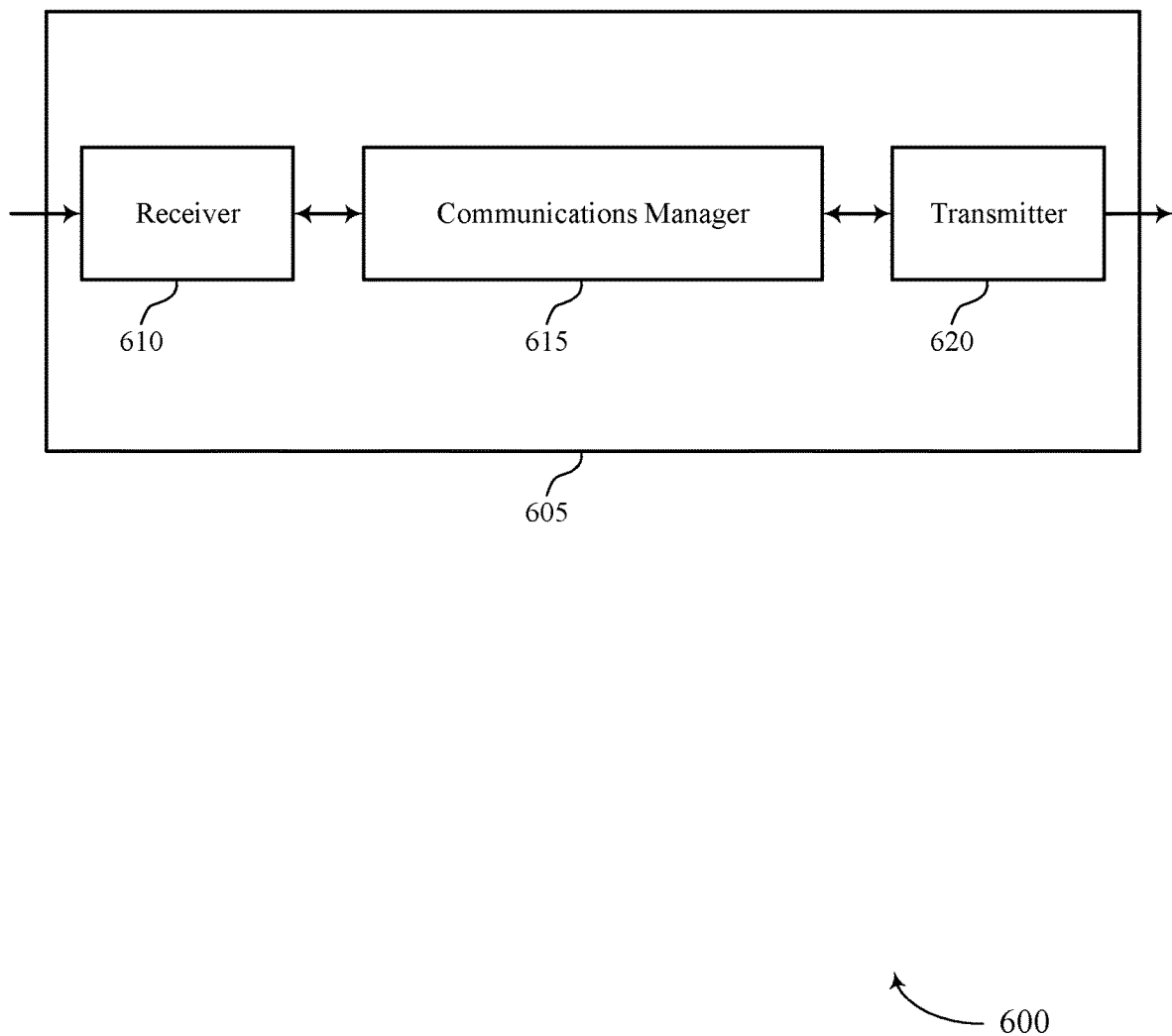
FIGS. 6 and 7 show block diagrams of devices that support non-coherent wake-up signal in accordance with aspects of the present disclosure.

FIG. 6 shows a block diagram 600 of a device 605 that supports non-coherent wake-up signal in accordance with aspects of the present disclosure. The device 605 may be an example of aspects of a UE 115 as described herein. The device 605 may include a receiver 610, a communications manager 615, and a transmitter 620. The device 605 may also include a processor. The communications manager 615 may include an example of the communications manager 534 illustrated in FIG. 5. Conversely, the communications manager 534 illustrated in FIG. 5 may include an example of the communications manager 615 illustrated in FIG. 6. Each of these components may be in communication with one another (e.g., via one or more buses).

The receiver 610 may receive information such as packets, user data, or control information associated with various information channels (e.g., control channels, data channels, and information related to non-coherent wake-up signal, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may enter a lower power mode of operation, enter the higher power mode based on identifying the indication, receive, from a base station, a non-coherent signal while the user equipment is operating in the lower power mode, and identify, based on receiving the non-coherent signal, an indication to transition from the lower power mode to a higher power mode of operation. The communications manager 615 may also enter a lower power mode of operation. The communications manager 615 may receive, from a base station, a non-coherent signal while the user equipment is operating in the lower power mode. The communications manager 615 may identify, with a wake-up component associated with a first power source of the user equipment that is isolated from a second power source associated with a baseband component, an indication to transition from operating in the lower power mode to a higher power mode of operation, where the indication to transition from the lower power mode is based on receiving the non-coherent signal. The communications manager 615 may activate, with the wake-up component, the baseband component and causing the user equipment to enter the higher power mode based on identifying the indication. The communications manager 615 may be an example of aspects of the communications manager 910 described herein.

The actions performed by the communications manager 615 as described herein may be implemented to realize one or more potential advantages. For example, receiving and processing a non-coherent signal (e.g., non-coherent WUS) a UE 115 may reduce the complexity used for processing the WUS as compared to other types of WUS, thereby significantly reducing power consumption at the UE 115 and improving the power saving efficiency of the lower power mode of operation.

Based on receiving and processing a non-coherent signal, a processor of the UE 115 (e.g., a processor controlling the receiver 610, the communications manager 615, the transmitter 620, etc.) may reduce processing resources used for processing the non-coherent signal as compared to the processing resources used for processing other types of WUS. For example, processing the non-coherent signal may not use channel estimation, signal equalization, or both, thereby reducing processing and memory complexity, reducing latency, and reducing power consumption at the UE 115.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver component. For example, the transmitter 620 may be an example of aspects of the transceiver 920 described with reference to FIG. 9. The transmitter 620 may utilize a single antenna or a set of antennas.

Figure 7:
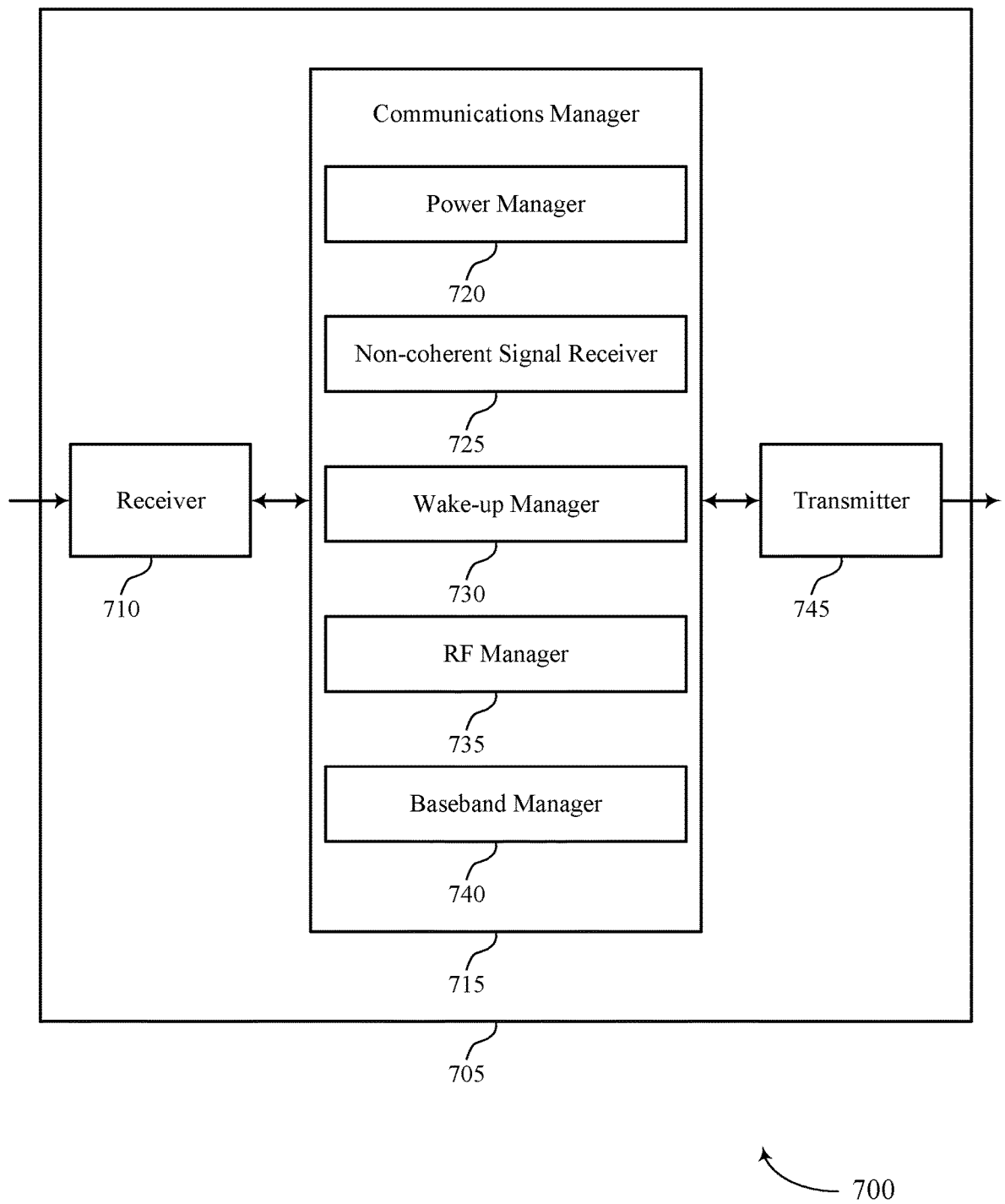

FIG. 7 shows a block diagram 700 of a device 705 that supports non-coherent wake-up signal in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to non-coherent wake-up signal, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a power manager 720, a non-coherent signal receiver 725, a wake-up manager 730, a RF manager 735, and a baseband manager 740. The communications manager 715 may be an example of aspects of the communications manager 910 described herein.

The power manager 720 may enter a lower power mode of operation. The non-coherent signal receiver 725 may receive, from a base station, a non-coherent signal while the user equipment is operating in the lower power mode. The wake-up manager 730 may identify, based on receiving the non-coherent signal, an indication to transition from the lower power mode to a higher power mode of operation. In particular, the wake-up manager 730 may identify, with a wake-up component associated with a first power source of the user equipment that is isolated from a second power source associated with a baseband component, an indication to transition from operating in the lower power mode to a higher power mode of operation.

The power manager 720 may enter a lower power mode of operation. In some cases, the power manager 720 may and enter the higher power mode based on identifying the indication to transition from the lower power mode to the higher power mode.

The RF manager 735 may receive signals from a base station. In some cases, RF manager 735 may receive a non-coherent signal from the base station when the user equipment operates in a lower power mode.

The baseband manager 740 may process the one or more signals received from the base station. In some cases, the baseband manager 740 may cause at least a portion of the baseband component to be inactive while the user equipment operates in the lower power mode.

The transmitter 745 may transmit signals generated by other components of the device 705. In some examples, the transmitter 745 may be collocated with a receiver 710 in a transceiver component. For example, the transmitter 745 may be an example of aspects of the transceiver 920 described with reference to FIG. 9. The transmitter 745 may utilize a single antenna or a set of antennas.

Figure 8:
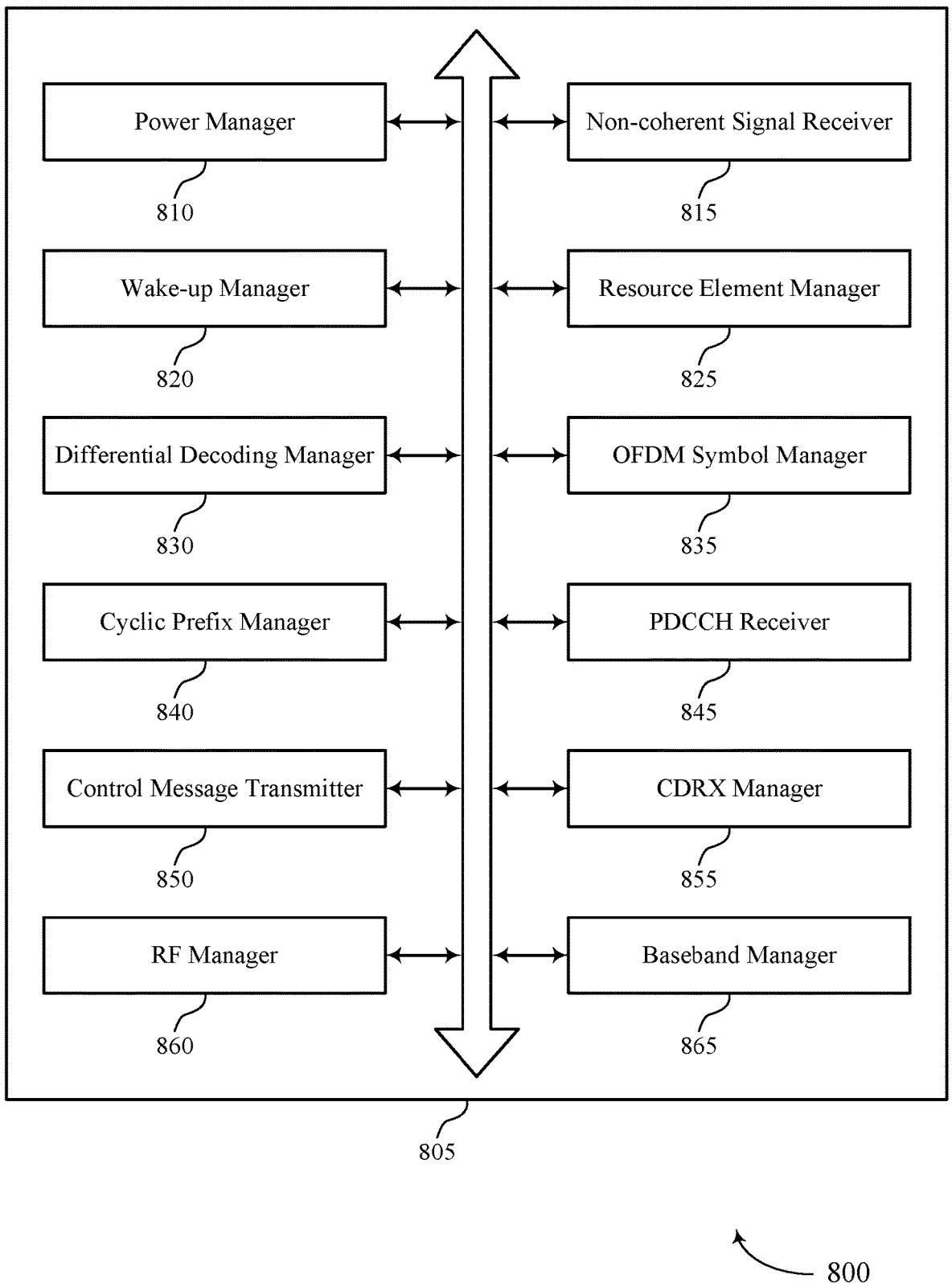
FIG. 8 shows a block diagram of a communications manager that supports non-coherent wake-up signal in accordance with aspects of the present disclosure.

FIG. 8 shows a block diagram 800 of a communications manager 805 that supports non-coherent wake-up signal in accordance with aspects of the present disclosure. The communications manager 805 may be an example of aspects of a communications manager 615, a communications manager 715, or a communications manager 910 described herein. The communications manager 805 may include a power manager 810, a non-coherent signal receiver 815, a wake-up manager 820, a resource element manager 825, a differential decoding manager 830, an OFDM symbol manager 835, a cyclic prefix manager 840, a PDCCH receiver 845, a control message transmitter 850, a CDRX manager 855, a RF manager 860, and a baseband manager 865. Each of these components may communicate, directly or indirectly, with one another (e.g., via one or more buses).

The control message transmitter 850 may transmit a control message including a second indication that the user equipment is configured to receive the non-coherent signal as part of a configuration procedure, where receiving the non-coherent signal is based on transmitting the control message. In some examples, the control message transmitter 850 may transmit the control message including the indication that the user equipment is configured to receive the non-coherent signal occurs prior to entering the lower power mode of operation. In some examples, the control message transmitter 850 may transmit a control message including a second indication that the user equipment is configured to receive the non-coherent signal as part of a configuration procedure, where receiving the non-coherent signal is based on transmitting the control message. In some examples, the control message transmitter 850 may transmit the control message including the indication that the user equipment is configured to receive the non-coherent signal occurs prior to entering the lower power mode of operation. In some examples, the control message transmitter 850 may transmit a control message including a second indication that the user equipment is configured to receive the non-coherent signal as part of a configuration procedure, where receiving the non-coherent signal is based on transmitting the control message.

The power manager 810 may enter a lower power mode of operation. The non-coherent signal receiver 815 may receive, from a base station, a non-coherent signal while the user equipment is operating in the lower power mode. In some examples, the non-coherent signal receiver 815 may receive, from a base station, a non-coherent signal while the user equipment is operating in the lower power mode.

The PDCCH receiver 845 may receive the non-coherent signal includes receiving the non-coherent signal via a PDCCH. In some cases, the non-coherent signal is conveyed over a PDCCH.

The wake-up manager 820 may identify, based on receiving the non-coherent signal, an indication to transition from the lower power mode to a higher power mode of operation. In some examples, the wake-up manager 820 may identify, with a wake-up component associated with a first power source of the user equipment that is isolated from a second power source associated with a baseband component, an indication to transition from operating in the lower power mode to a higher power mode of operation, where the indication to transition from the lower power mode is based on receiving the non-coherent signal. In some examples, the wake-up manager 820 may activate, with the wake-up component, the baseband component and causing the user equipment to enter the higher power mode based on identifying the indication. In some examples, the wake-up manager 820 may identify, with a wake-up component associated with a first power source of the user equipment that is isolated from a second power source associated with a baseband component, the indication to transition to the higher power mode based on receiving the non-coherent signal. In some examples, the power manager 810 may enter the higher power mode based on identifying the indication.

The RF manager 860 may receive signals from a base station. In some cases, RF manager 860 may receive a non-coherent signal from the base station when the user equipment operates in a lower power mode.

The baseband manager 865 may process the one or more signals received from the base station. In some cases, the baseband manager 865 may cause at least a portion of the baseband component to be inactive while the user equipment operates in the lower power mode.

The resource element manager 825 may identify, within the non-coherent signal, a first resource element and a second resource element. In some examples, the resource element manager 825 may identify, within the non-coherent signal, a first resource element and a second resource element. In some examples, the resource element manager 825 may identify, within the non-coherent signal, a first resource element and a second resource element preceding the first resource element.

The differential decoding manager 830 may perform one or more differential decoding operations on the first resource element and the second resource element to generate an indicator value, where identifying the indication to transition from the lower power mode to the higher power mode is based on the indicator value. In some examples, the differential decoding manager 830 may multiply the first resource element by a conjugate of the second resource element, where performing the one or more differential decoding operations is based on multiplying the first resource element by the conjugate of the second resource element. In some examples, the differential decoding manager 830 may perform one or more differential decoding operations on the first resource element and the second resource element to generate an indicator value, where identifying the indication to transition from the lower power mode to the higher power mode is based on the indicator value.

In some examples, the differential decoding manager 830 may perform one or more differential decoding operations on the first resource element and the second resource element to generate an indicator value where identifying the indication to transition from the lower power mode to the higher power mode is based on the indicator value. In some cases, the indicator value includes an LLR value. In some cases, the second resource element immediately precedes the first resource element.

The OFDM symbol manager 835 may identify an orthogonal frequency division multiplexing (OFDM) symbol within the non-coherent signal. The cyclic prefix manager 840 may remove a cyclic prefix from the OFDM symbol to retrieve the first resource element, where identifying the first resource element is based on removing the cyclic prefix from the OFDM symbol.

The CDRX manager 855 may enter the lower power mode of operation includes entering an inactive period of a discontinuous reception cycle, and where entering the higher power mode of operation includes entering an active period of the discontinuous reception cycle. In some cases, the lower power mode of operation includes an inactive period of a discontinuous reception cycle. In some cases, the higher power mode of operation includes an active period of the discontinuous reception cycle.

Figure 9:
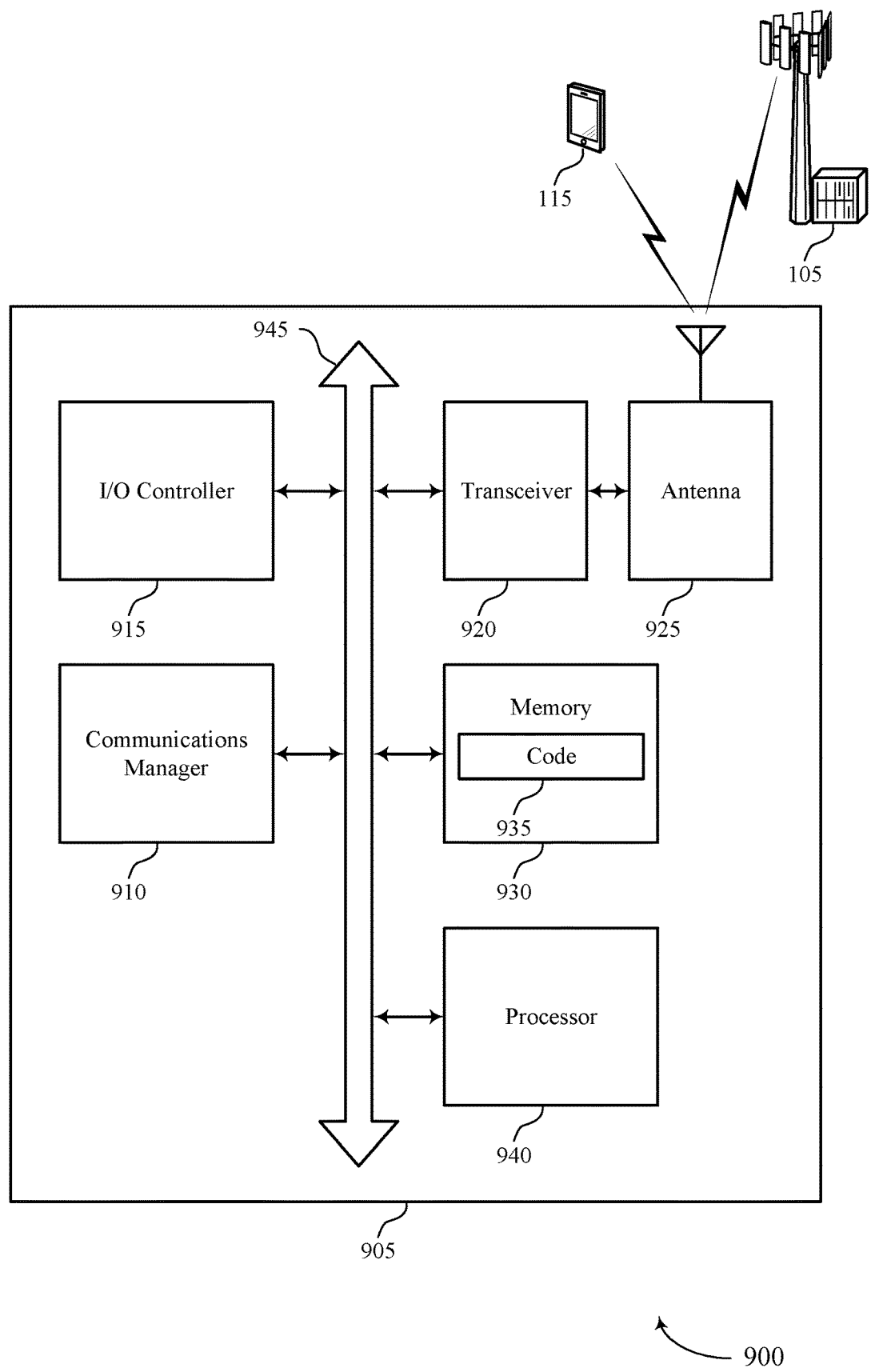
FIG. 9 shows a diagram of a system including a device that supports non-coherent wake-up signal in accordance with aspects of the present disclosure.

FIG. 9 shows a diagram of a system 900 including a device 905 that supports non-coherent wake-up signal in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may enter a lower power mode of operation, enter the higher power mode based on identifying the indication, receive, from a base station, a non-coherent signal while the user equipment is operating in the lower power mode, and identify, based on receiving the non-coherent signal, an indication to transition from the lower power mode to a higher power mode of operation. The communications manager 910 may also enter a lower power mode of operation, receive, from a base station, a non-coherent signal while the user equipment is operating in the lower power mode, identify, with a wake-up component associated with a first power source of the user equipment that is isolated from a second power source associated with a baseband component, an indication to transition from operating in the lower power mode to a higher power mode of operation, where the indication to transition from the lower power mode is based on receiving the non-coherent signal, and activate, with the wake-up component, the baseband component and causing the user equipment to enter the higher power mode based on identifying the indication. in some cases, a radio frequency component for receiving one or more signals from a base station, the radio frequency component configured to receive a non-coherent signal from the base station when the user equipment operates in a lower power mode in some cases, a baseband component coupled with the radio frequency component and for processing the one or more signals received from the base station, where at least a portion of the baseband component is inactive while the user equipment operates in the lower power mode in some cases, a wake-up component coupled with the radio frequency component and the baseband component, the wake-up component for identifying an indication in the non-coherent signal that the user equipment is to transition from operating in the lower power mode to operating in a higher power mode, the wake-up component for activating the portion of the baseband component based on identifying the indication The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting non-coherent wake-up signal).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
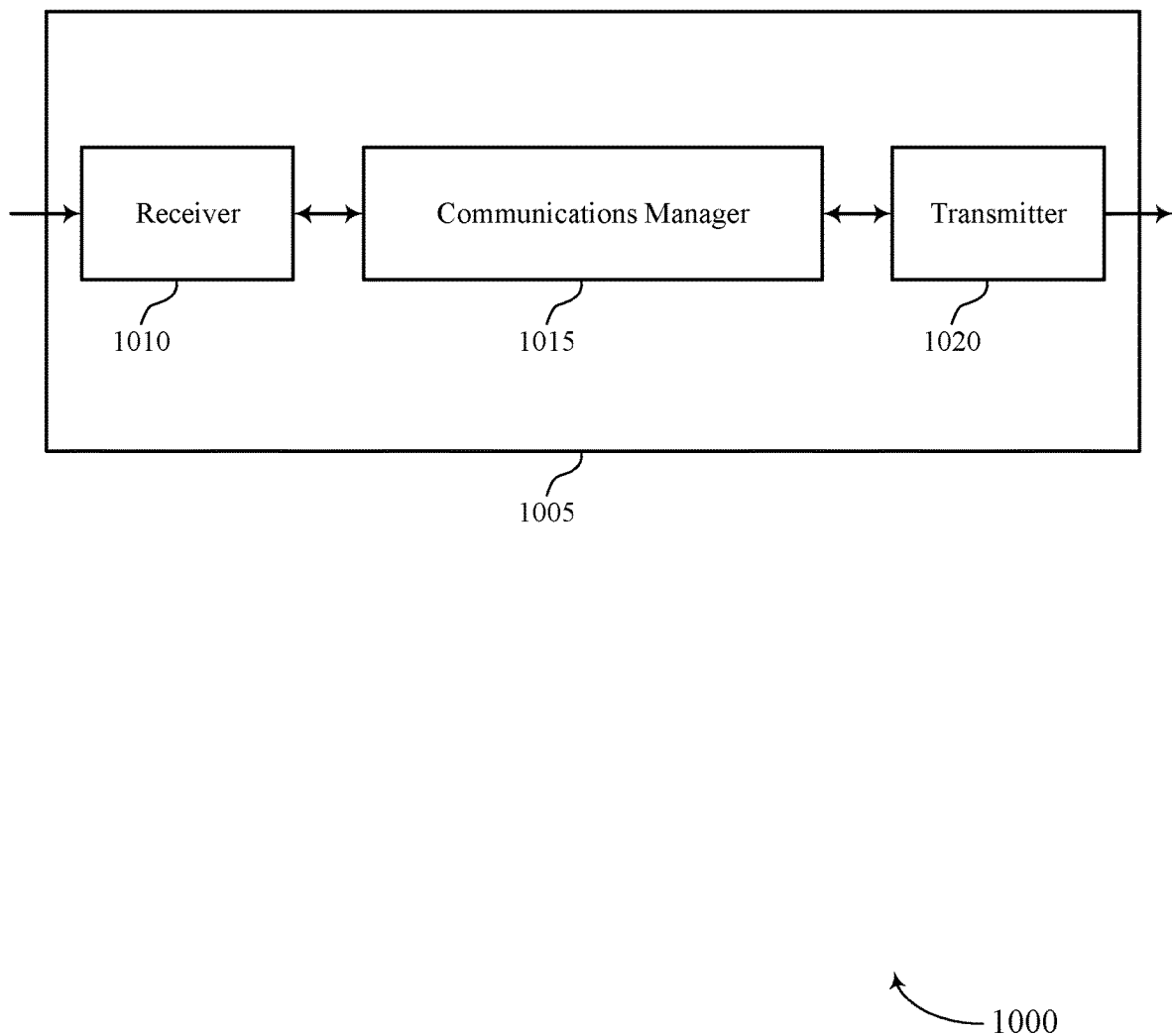
FIGS. 10 and 11 show block diagrams of devices that support non-coherent wake-up signal in accordance with aspects of the present disclosure.

FIG. 10 shows a block diagram 1000 of a device 1005 that supports non-coherent wake-up signal in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to non-coherent wake-up signal, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify that a user equipment is in a lower power mode of operation, identify traffic waiting to be transmitted to the user equipment, and transmit, based on identifying the traffic, a non-coherent signal to the user equipment while the user equipment is operating in the lower power mode, the non-coherent signal including an indication for the user equipment to transition from the lower power mode to a higher power mode of operation to receive the traffic. The communications manager 1015 may be an example of aspects of the communications manager 1310 described herein.

The actions performed by the communications manager 1310 as described herein may be implemented to realize one or more potential advantages. For example, transmitting a non-coherent signal (e.g., non-coherent WUS) to a UE 115 may enable the UE 115 to reduce the complexity used for processing the WUS as compared to other types of WUS, thereby significantly reducing power consumption at the UE 115 and improving the power saving efficiency of the lower power mode of operation.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, an FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver component. For example, the transmitter 1020 may be an example of aspects of the transceiver 1320 described with reference to FIG. 13. The transmitter 1020 may utilize a single antenna or a set of antennas.

Figure 11:
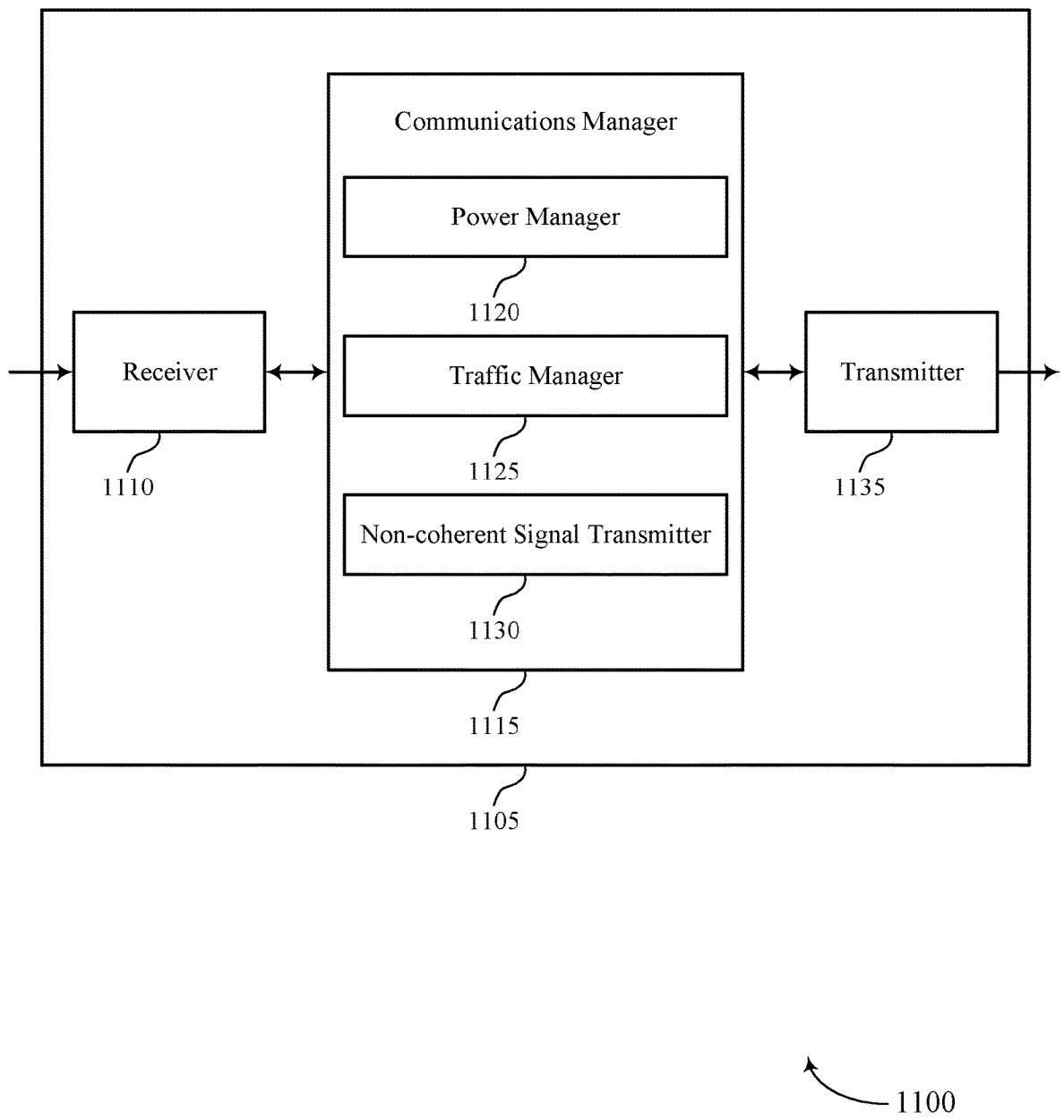

FIG. 11 shows a block diagram 1100 of a device 1105 that supports non-coherent wake-up signal in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to non-coherent wake-up signal, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a power manager 1120, a traffic manager 1125, and a non-coherent signal transmitter 1130. The communications manager 1115 may be an example of aspects of the communications manager 1310 described herein.

The power manager 1120 may identify that a user equipment is in a lower power mode of operation.

The traffic manager 1125 may identify traffic waiting to be transmitted to the user equipment.

The non-coherent signal transmitter 1130 may transmit, based on identifying the traffic, a non-coherent signal to the user equipment while the user equipment is operating in the lower power mode, the non-coherent signal including an indication for the user equipment to transition from the lower power mode to a higher power mode of operation to receive the traffic.

The transmitter 1135 may transmit signals generated by other components of the device 1105. In some examples, the transmitter 1135 may be collocated with a receiver 1110 in a transceiver component. For example, the transmitter 1135 may be an example of aspects of the transceiver 1320 described with reference to FIG. 13. The transmitter 1135 may utilize a single antenna or a set of antennas.

Figure 12:
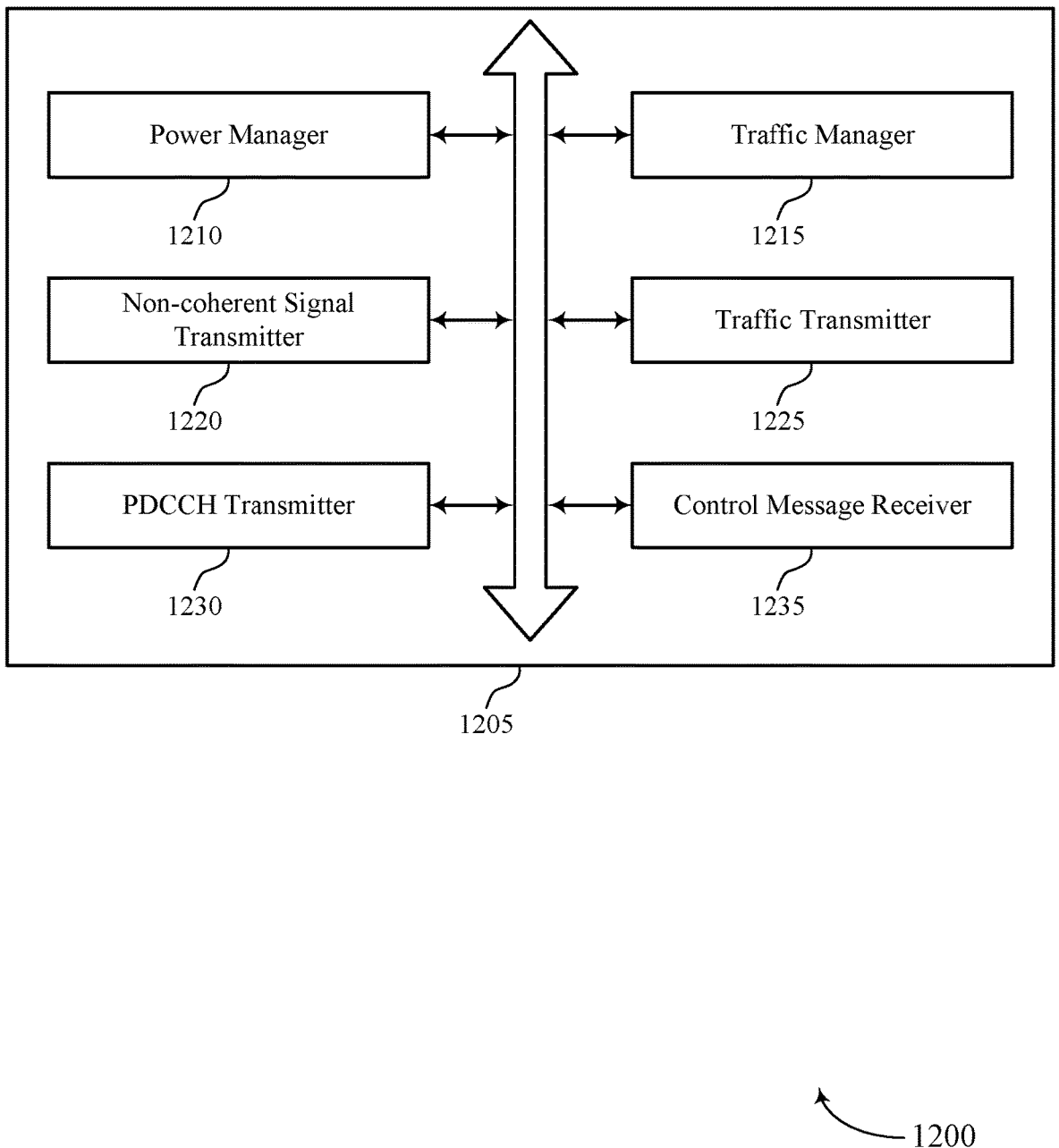
FIG. 12 shows a block diagram of a communications manager that supports non-coherent wake-up signal in accordance with aspects of the present disclosure.

FIG. 12 shows a block diagram 1200 of a communications manager 1205 that supports non-coherent wake-up signal in accordance with aspects of the present disclosure. The communications manager 1205 may be an example of aspects of a communications manager 1015, a communications manager 1115, or a communications manager 1310 described herein. The communications manager 1205 may include a power manager 1210, a traffic manager 1215, a non-coherent signal transmitter 1220, a traffic transmitter 1225, a PDCCH transmitter 1230, and a control message receiver 1235. Each of these components may communicate, directly or indirectly, with one another (e.g., via one or more buses).

The power manager 1210 may identify that a user equipment is in a lower power mode of operation. In some examples, the power manager 1210 may identify a set of one or more user equipment operating in the lower power mode of operation.

The traffic manager 1215 may identify traffic waiting to be transmitted to the user equipment. In some examples, the traffic manager 1215 may identify traffic waiting to be transmitted to at least one user equipment of the set of one or more user equipment.

The non-coherent signal transmitter 1220 may transmit, based on identifying the traffic, a non-coherent signal to the user equipment while the user equipment is operating in the lower power mode, the non-coherent signal including an indication for the user equipment to transition from the lower power mode to a higher power mode of operation to receive the traffic. In some examples, the non-coherent signal transmitter 1220 may identify that the user equipment is in the higher power mode of operation based on transmitting the non-coherent signal, where transmitting the traffic is based on transmitting the traffic to the user equipment.

In some examples, the non-coherent signal transmitter 1220 may transmit, based on identifying the traffic, the non-coherent signal to the set of one or more user equipment while the set of one or more user equipment is operating in the lower power mode, the non-coherent signal including a second indication for each user equipment of the set of one or more user equipment to transition from the lower power mode to the higher power mode of operation to receive the traffic.

The traffic transmitter 1225 may transmit, to the user equipment, the traffic to the user equipment based on transmitting the non-coherent signal.

The PDCCH transmitter 1230 may transmit the non-coherent signal to the user equipment includes transmitting the non-coherent signal via a PDCCH.

The control message receiver 1235 may receive, from the user equipment, a control message including a second indication that the user equipment is configured to receive the non-coherent signal as part of a configuration procedure, where receiving the non-coherent signal is based on transmitting the control message.

Figure 13:
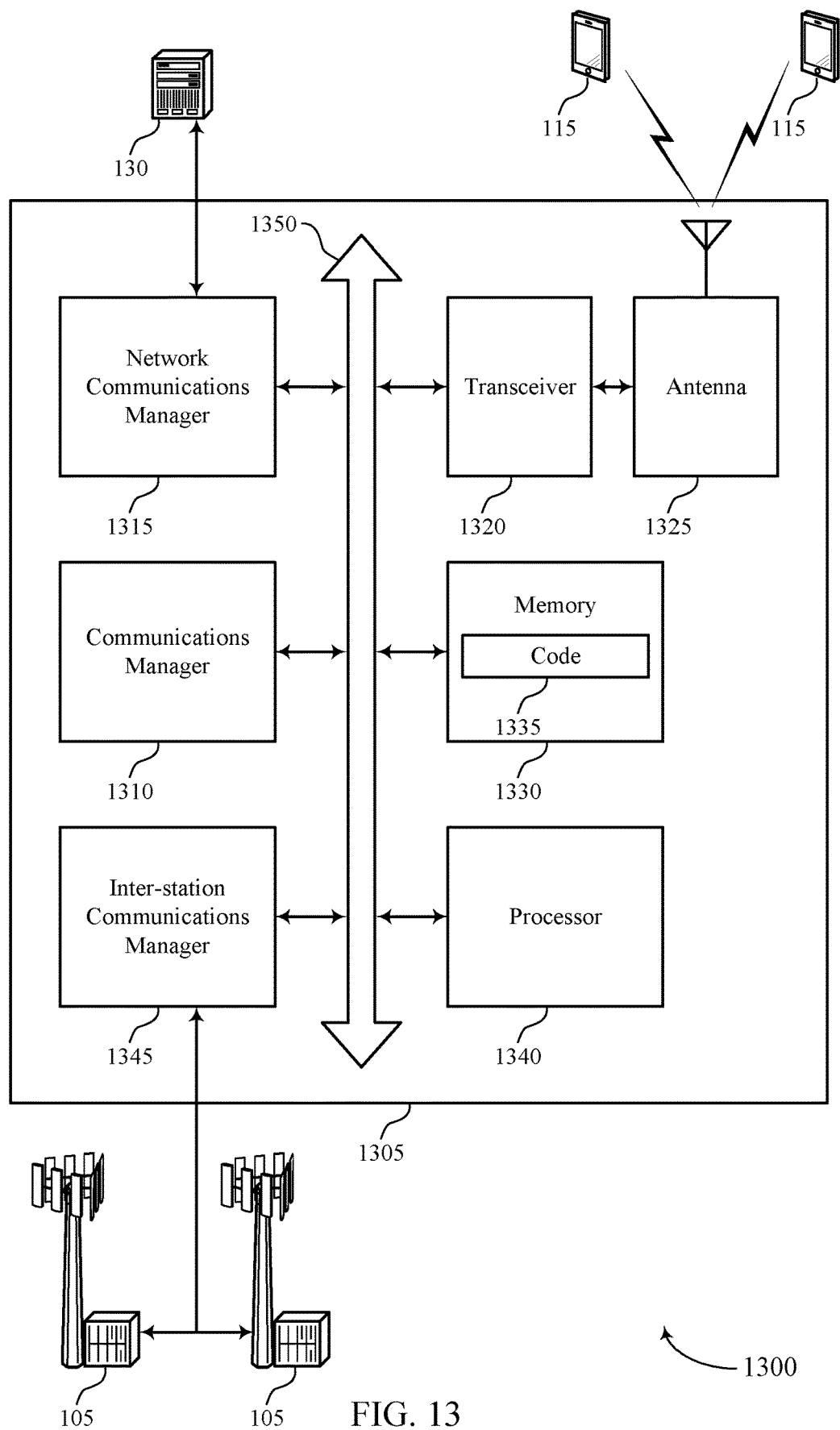
FIG. 13 shows a diagram of a system including a device that supports non-coherent wake-up signal in accordance with aspects of the present disclosure.

FIG. 13 shows a diagram of a system 1300 including a device 1305 that supports non-coherent wake-up signal in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify that a user equipment is in a lower power mode of operation, identify traffic waiting to be transmitted to the user equipment, and transmit, based on identifying the traffic, a non-coherent signal to the user equipment while the user equipment is operating in the lower power mode, the non-coherent signal including an indication for the user equipment to transition from the lower power mode to a higher power mode of operation to receive the traffic.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting non-coherent wake-up signal).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
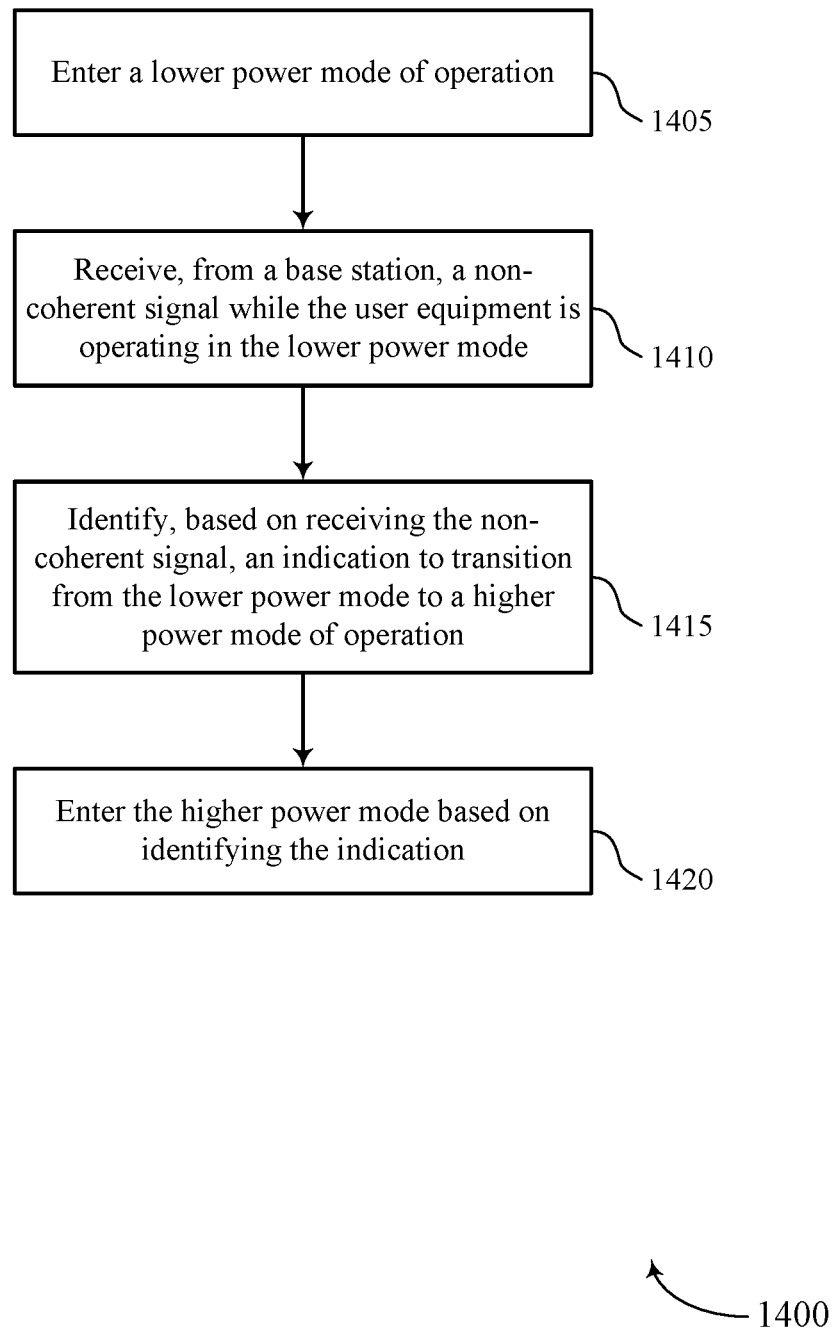
FIGS. 14 through 19 show flowcharts illustrating methods that support non-coherent wake-up signal in accordance with aspects of the present disclosure.

FIG. 14 shows a flowchart illustrating a method 1400 that supports non-coherent wake-up signal in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may enter a lower power mode of operation. The operations of 1405 may be performed according to the methods described herein. In some examples, aspects of the operations of 1405 may be performed by a power manager as described with reference to FIGS. 6 through 9.

At 1410, the UE may receive, from a base station, a non-coherent signal while the user equipment is operating in the lower power mode. The operations of 1410 may be performed according to the methods described herein. In some examples, aspects of the operations of 1410 may be performed by a non-coherent signal receiver as described with reference to FIGS. 6 through 9.

At 1415, the UE may identify, based on receiving the non-coherent signal, an indication to transition from the lower power mode to a higher power mode of operation. The operations of 1415 may be performed according to the methods described herein. In some examples, aspects of the operations of 1415 may be performed by a wake-up manager as described with reference to FIGS. 6 through 9.

At 1420, the UE may enter the higher power mode based on identifying the indication. The operations of 1420 may be performed according to the methods described herein. In some examples, aspects of the operations of 1420 may be performed by a power manager as described with reference to FIGS. 6 through 9.

Figure 15:
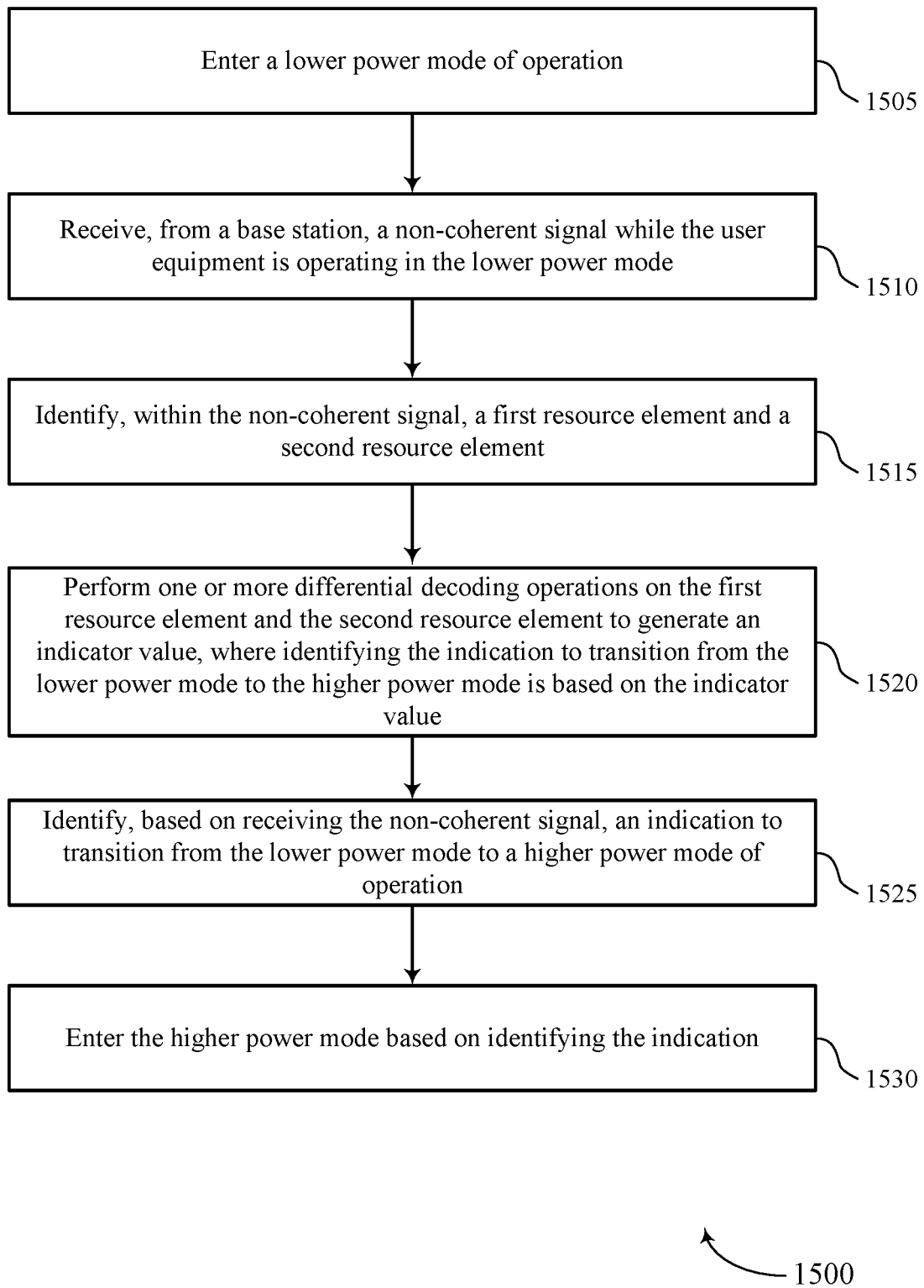

FIG. 15 shows a flowchart illustrating a method 1500 that supports non-coherent wake-up signal in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may enter a lower power mode of operation. The operations of 1505 may be performed according to the methods described herein. In some examples, aspects of the operations of 1505 may be performed by a power manager as described with reference to FIGS. 6 through 9.

At 1510, the UE may receive, from a base station, a non-coherent signal while the user equipment is operating in the lower power mode. The operations of 1510 may be performed according to the methods described herein. In some examples, aspects of the operations of 1510 may be performed by a non-coherent signal receiver as described with reference to FIGS. 6 through 9.

At 1515, the UE may identify, within the non-coherent signal, a first resource element and a second resource element. The operations of 1515 may be performed according to the methods described herein. In some examples, aspects of the operations of 1515 may be performed by a resource element manager as described with reference to FIGS. 6 through 9.

At 1520, the UE may perform one or more differential decoding operations on the first resource element and the second resource element to generate an indicator value, where identifying the indication to transition from the lower power mode to the higher power mode is based on the indicator value. The operations of 1520 may be performed according to the methods described herein. In some examples, aspects of the operations of 1520 may be performed by a differential decoding manager as described with reference to FIGS. 6 through 9.

At 1525, the UE may identify, based on receiving the non-coherent signal, an indication to transition from the lower power mode to a higher power mode of operation. The operations of 1525 may be performed according to the methods described herein. In some examples, aspects of the operations of 1525 may be performed by a wake-up manager as described with reference to FIGS. 6 through 9.

At 1530, the UE may enter the higher power mode based on identifying the indication. The operations of 1530 may be performed according to the methods described herein. In some examples, aspects of the operations of 1530 may be performed by a power manager as described with reference to FIGS. 6 through 9.

Figure 16:
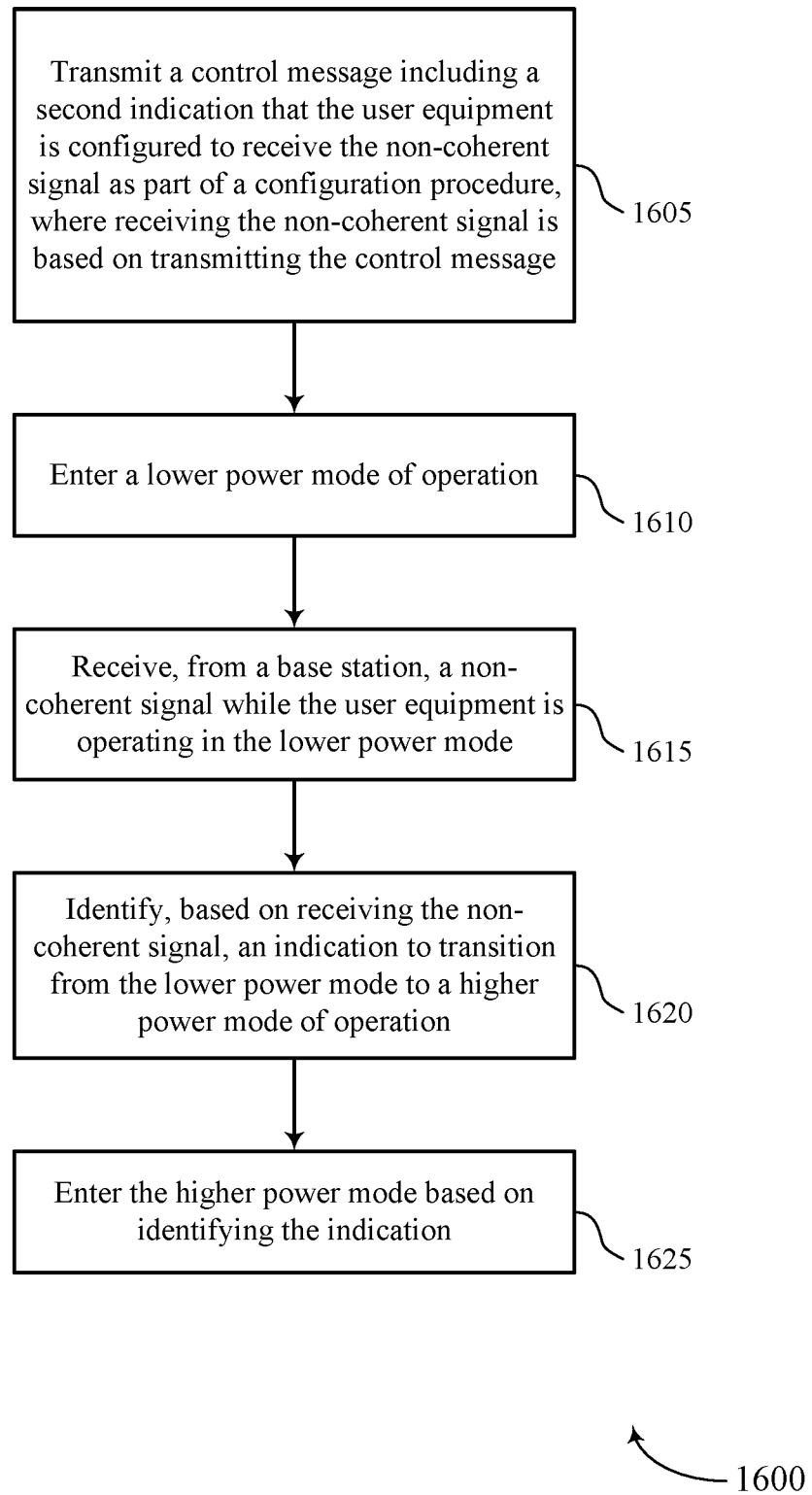

FIG. 16 shows a flowchart illustrating a method 1600 that supports non-coherent wake-up signal in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may transmit a control message including a second indication that the user equipment is configured to receive the non-coherent signal as part of a configuration procedure, where receiving the non-coherent signal is based on transmitting the control message. The operations of 1605 may be performed according to the methods described herein. In some examples, aspects of the operations of 1605 may be performed by a control message transmitter as described with reference to FIGS. 6 through 9.

At 1610, the UE may enter a lower power mode of operation. The operations of 1610 may be performed according to the methods described herein. In some examples, aspects of the operations of 1610 may be performed by a power manager as described with reference to FIGS. 6 through 9.

At 1615, the UE may receive, from a base station, a non-coherent signal while the user equipment is operating in the lower power mode. The operations of 1615 may be performed according to the methods described herein. In some examples, aspects of the operations of 1615 may be performed by a non-coherent signal receiver as described with reference to FIGS. 6 through 9.

At 1620, the UE may identify, based on receiving the non-coherent signal, an indication to transition from the lower power mode to a higher power mode of operation. The operations of 1620 may be performed according to the methods described herein. In some examples, aspects of the operations of 1620 may be performed by a wake-up manager as described with reference to FIGS. 6 through 9.

At 1625, the UE may enter the higher power mode based on identifying the indication. The operations of 1625 may be performed according to the methods described herein. In some examples, aspects of the operations of 1625 may be performed by a power manager as described with reference to FIGS. 6 through 9.

Figure 17:
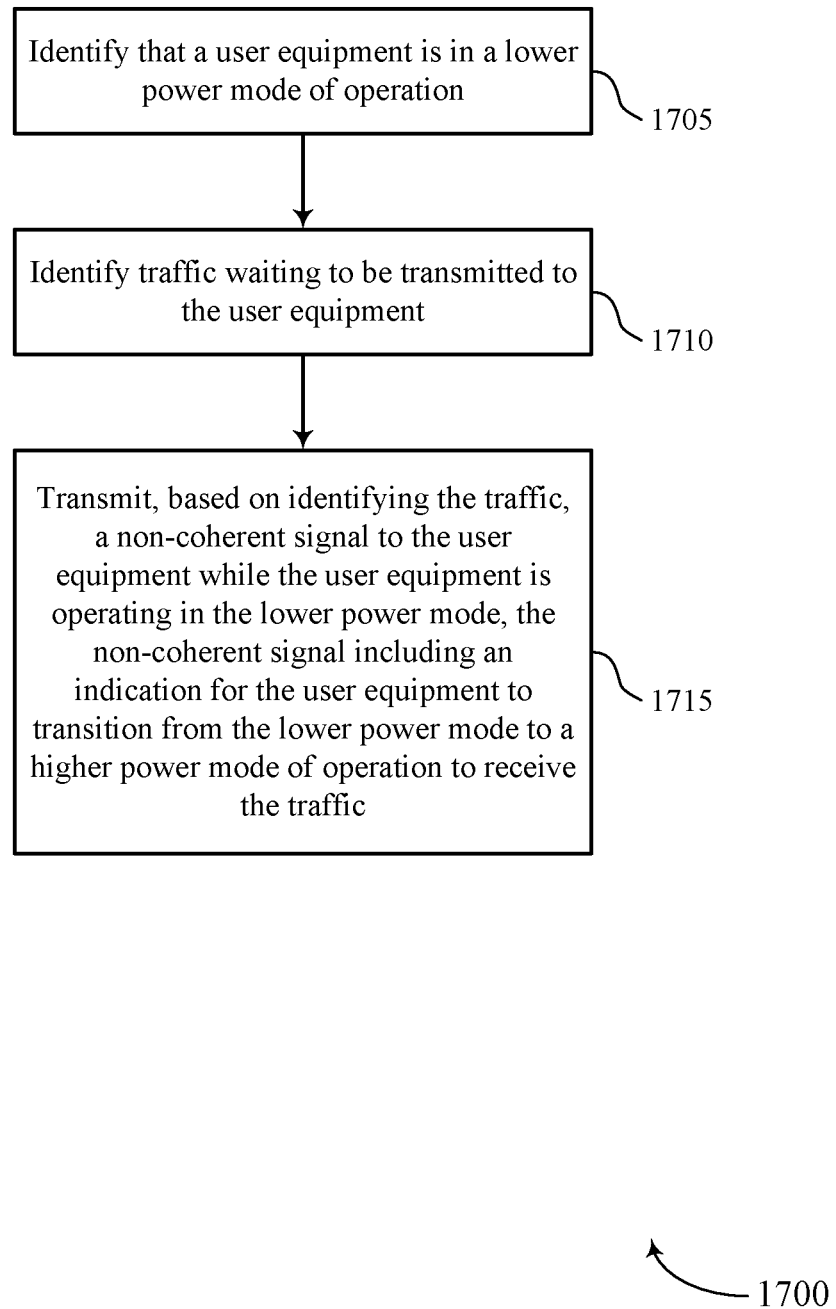

FIG. 17 shows a flowchart illustrating a method 1700 that supports non-coherent wake-up signal in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify that a user equipment is in a lower power mode of operation. The operations of 1705 may be performed according to the methods described herein. In some examples, aspects of the operations of 1705 may be performed by a power manager as described with reference to FIGS. 10 through 13.

At 1710, the base station may identify traffic waiting to be transmitted to the user equipment. The operations of 1710 may be performed according to the methods described herein. In some examples, aspects of the operations of 1710 may be performed by a traffic manager as described with reference to FIGS. 10 through 13.

At 1715, the base station may transmit, based on identifying the traffic, a non-coherent signal to the user equipment while the user equipment is operating in the lower power mode, the non-coherent signal including an indication for the user equipment to transition from the lower power mode to a higher power mode of operation to receive the traffic. The operations of 1715 may be performed according to the methods described herein. In some examples, aspects of the operations of 1715 may be performed by a non-coherent signal transmitter as described with reference to FIGS. 10 through 13.

Figure 18:
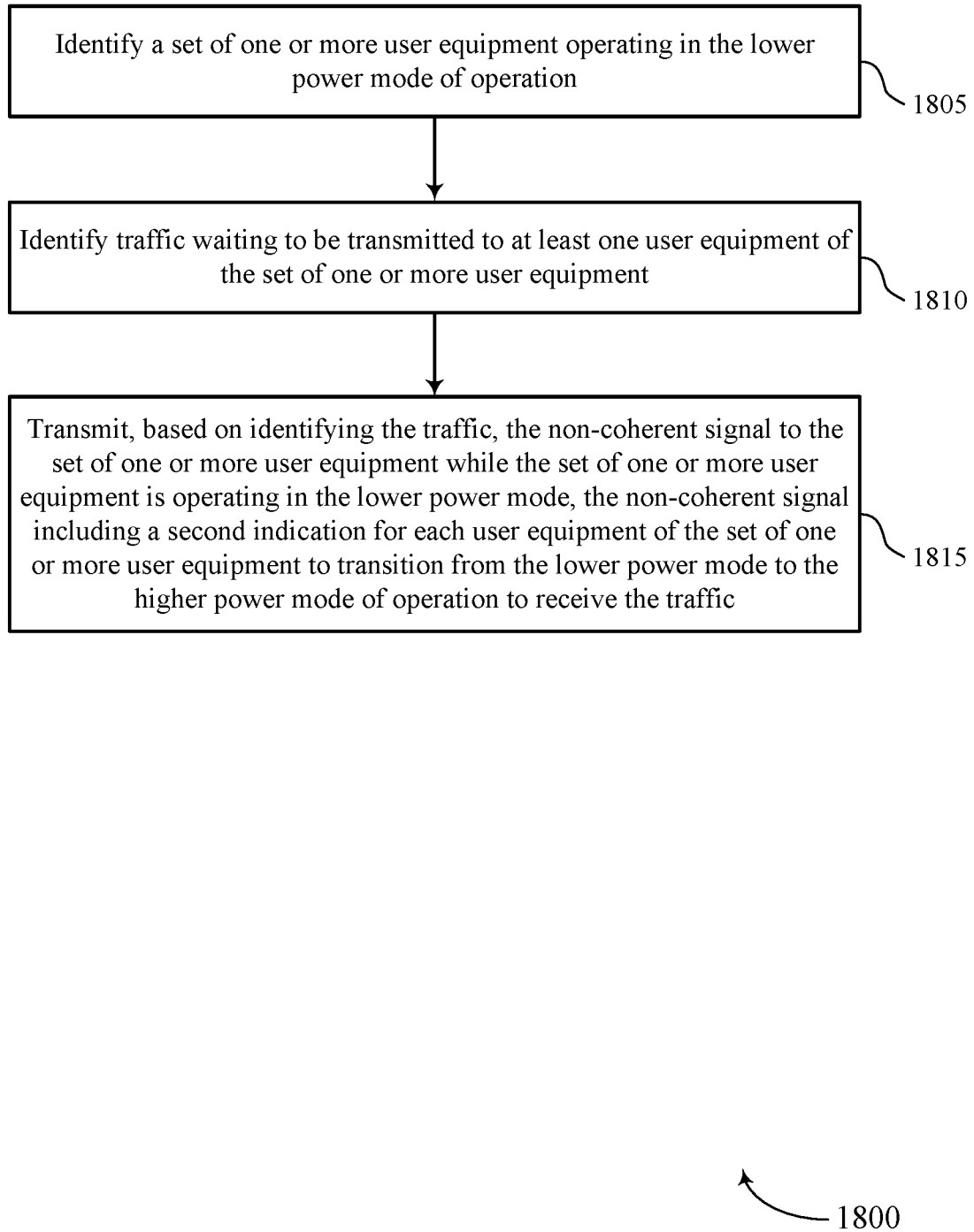

FIG. 18 shows a flowchart illustrating a method 1800 that supports non-coherent wake-up signal in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify a set of one or more user equipment operating in the lower power mode of operation. The operations of 1805 may be performed according to the methods described herein. In some examples, aspects of the operations of 1805 may be performed by a power manager as described with reference to FIGS. 10 through 13.

At 1810, the base station may identify traffic waiting to be transmitted to at least one user equipment of the set of one or more user equipment. The operations of 1810 may be performed according to the methods described herein. In some examples, aspects of the operations of 1810 may be performed by a traffic manager as described with reference to FIGS. 10 through 13.

At 1815, the base station may transmit, based on identifying the traffic, the non-coherent signal to the set of one or more user equipment while the set of one or more user equipment is operating in the lower power mode, the non-coherent signal including a second indication for each user equipment of the set of one or more user equipment to transition from the lower power mode to the higher power mode of operation to receive the traffic. The operations of 1815 may be performed according to the methods described herein. In some examples, aspects of the operations of 1815 may be performed by a non-coherent signal transmitter as described with reference to FIGS. 10 through 13.

Figure 19:
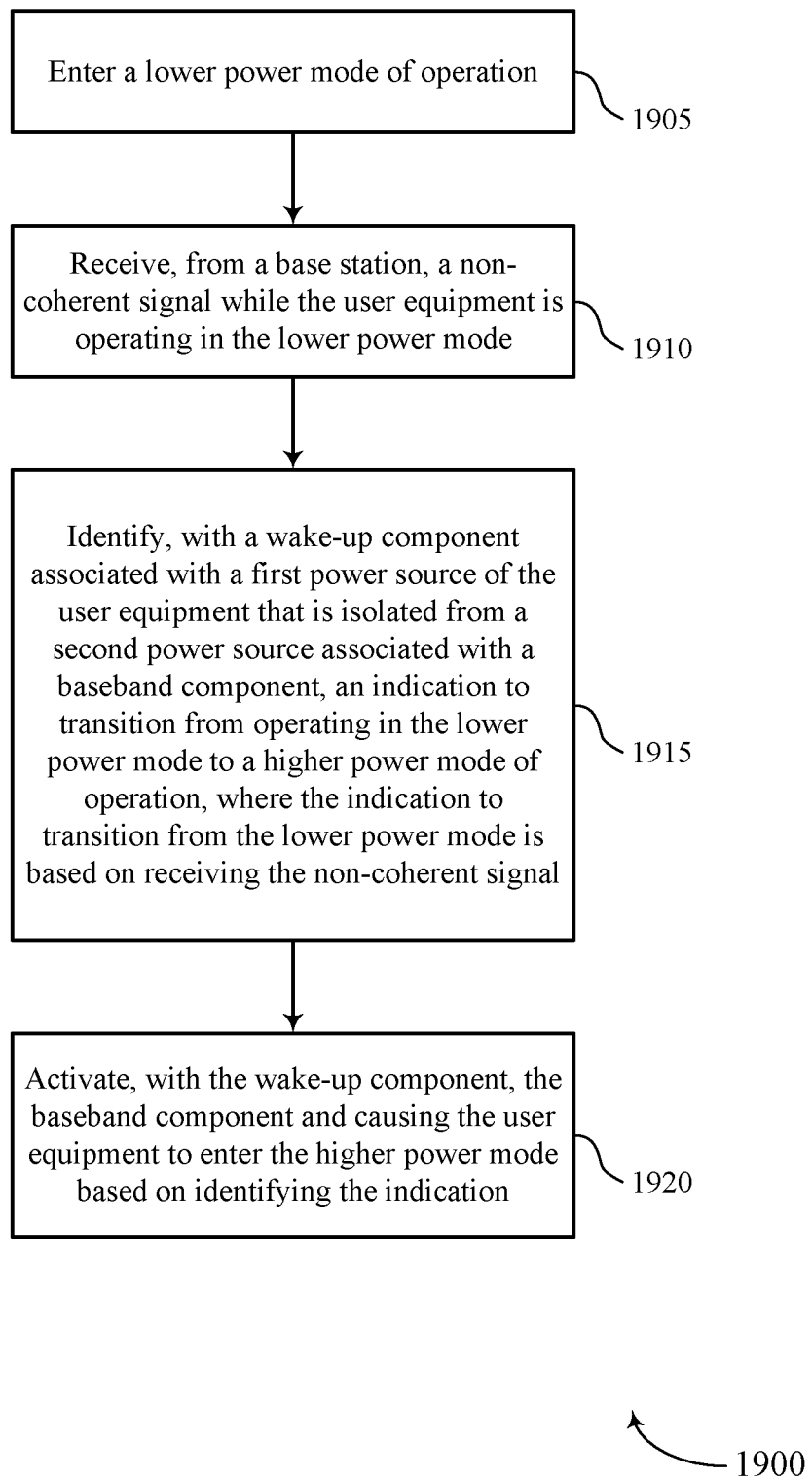

FIG. 19 shows a flowchart illustrating a method 1900 that supports non-coherent wake-up signal in accordance with aspects of the present disclosure. The operations of method 1900 may be implemented by a UE 115 or its components as described herein. For example, the operations of method 1900 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1905, the UE may enter a lower power mode of operation. The operations of 1905 may be performed according to the methods described herein. In some examples, aspects of the operations of 1905 may be performed by a power manager as described with reference to FIGS. 6 through 9.

At 1910, the UE may receive, from a base station, a non-coherent signal while the user equipment is operating in the lower power mode. The operations of 1910 may be performed according to the methods described herein. In some examples, aspects of the operations of 1910 may be performed by a non-coherent signal receiver as described with reference to FIGS. 6 through 9.

At 1915, the UE may identify, with a wake-up component associated with a first power source of the user equipment that is isolated from a second power source associated with a baseband component, an indication to transition from operating in the lower power mode to a higher power mode of operation, where the indication to transition from the lower power mode is based on receiving the non-coherent signal. The operations of 1915 may be performed according to the methods described herein. In some examples, aspects of the operations of 1915 may be performed by a wake-up manager as described with reference to FIGS. 6 through 9.

At 1920, the UE may activate, with the wake-up component, the baseband component and causing the user equipment to enter the higher power mode based on identifying the indication. The operations of 1920 may be performed according to the methods described herein. In some examples, aspects of the operations of 1920 may be performed by a wake-up manager as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment, comprising:
    transmitting a control message indicating a capability of the user equipment to receive non-coherent signals;
    entering a lower power mode of operation;
    receiving, from a network entity, a non-coherent signal while the user equipment is operating in the lower power mode and based at least in part on transmitting the control message;
    performing one or more differential decoding operations on a first resource element and a second resource element of the non-coherent signal to generate an indicator value;
    identifying, based at least in part on receiving the non-coherent signal, an indication to transition from the lower power mode to a higher power mode of operation, wherein identifying the indication to transition from the lower power mode to the higher power mode is based at least in part on the indicator value; and
    entering the higher power mode based at least in part on identifying the indication.

2. The method of claim 1, wherein identifying the indication to transition from the lower power mode of operation to the higher power mode of operation comprises:
    identifying, with a wake-up component associated with a first power source of the user equipment that is isolated from a second power source associated with a baseband component, the indication to transition from the lower power mode to the higher power mode based at least in part on receiving the non-coherent signal.

3. The method of claim 2, wherein the wake-up component comprises a processor, a field-programmable gate array (FPGA), or an application-specific integrated circuit (ASIC).

4. The method of claim 1, further comprising:
    identifying, within the non-coherent signal, the first resource element and the second resource element, wherein performing the one or more differential decoding operations is based at least in part on identifying the first resource element and the second resource element.

5. The method of claim 1, further comprising:
    multiplying the first resource element by a conjugate of the second resource element, wherein performing the one or more differential decoding operations is based at least in part on multiplying the first resource element by the conjugate of the second resource element.

6. The method of claim 1, wherein the indicator value comprises a logarithm likelihood ratio (LLR) value.

7. The method of claim 1, further comprising:
    identifying an orthogonal frequency division multiplexing (OFDM) symbol within the non-coherent signal; and
    removing a cyclic prefix from the OFDM symbol to retrieve the first resource element, wherein identifying the first resource element is based at least in part on removing the cyclic prefix from the OFDM symbol.

8. The method of claim 1, wherein the second resource element immediately precedes the first resource element.

9. The method of claim 1, wherein the non-coherent signal is conveyed over a physical downlink control channel (PDCCH).

10. The method of claim 1, wherein the control message is transmitted as part of a configuration procedure.

11. The method of claim 1, wherein:
    transmitting the control message indicating the capability of the user equipment to receive the non-coherent signal occurs prior to entering the lower power mode of operation.

12. The method of claim 1, wherein:
    the lower power mode of operation comprises an inactive period of a discontinuous reception cycle; and
    the higher power mode of operation comprises an active period of the discontinuous reception cycle.

13. A method for wireless communication at a network entity, comprising:
    receiving a control message indicating a capability of a user equipment to receive non-coherent signals;
    identifying that the user equipment is in a lower power mode of operation;
    identifying traffic waiting to be transmitted to the user equipment; and
    transmitting, to the user equipment based at least in part on identifying the traffic and receiving the control message, a non-coherent signal while the user equipment is operating in the lower power mode, the non-coherent signal including an indication for the user equipment to transition from the lower power mode to a higher power mode of operation to receive the traffic, wherein the indication to transition from the lower power mode to the higher power mode is based at least in part on an indicator value generated via one or more differential operations performed on a first resource element and a second resource element of the non-coherent signal.

14. The method of claim 13, further comprising:
    transmitting, to the user equipment, the traffic to the user equipment based at least in part on transmitting the non-coherent signal.

15. The method of claim 14, further comprising:
identifying that the user equipment is in the higher power mode of operation based at least in part on transmitting the non-coherent signal, wherein transmitting the traffic is based at least in part on transmitting the traffic to the user equipment.

16. The method of claim 13, wherein:
transmitting the non-coherent signal to the user equipment comprises transmitting the non-coherent signal via a physical downlink control channel (PDCCH).

17. The method of claim 13, wherein the control message is transmitted as part of a configuration procedure.

18. The method of claim 13, further comprising:
identifying a set of one or more user equipment operating in the lower power mode of operation;
identifying traffic waiting to be transmitted to at least one user equipment of the set of one or more user equipment; and
transmitting, based at least in part on identifying the traffic, the non-coherent signal to the set of one or more user equipment while the set of one or more user equipment is operating in the lower power mode, the non-coherent signal including a second indication for each user equipment of the set of one or more user equipment to transition from the lower power mode to the higher power mode of operation to receive the traffic.

19. A method for wireless communication at a user equipment, comprising:
transmitting a control message indicating a capability of the user equipment to receive non-coherent signals;
entering a lower power mode of operation;
receiving, from a network entity, a non-coherent signal while the user equipment is operating in the lower power mode and based at least in part on transmitting the control message;
performing one or more differential decoding operations on a first resource element and a second resource element of the non-coherent signal to generate an indicator value;
identifying, with a wake-up component associated with a first power source of the user equipment that is isolated from a second power source associated with a baseband component, an indication to transition from operating in the lower power mode to a higher power mode of operation, wherein the indication to transition from the lower power mode is based at least in part on receiving the non-coherent signal and the indicator value; and
activating, with the wake-up component, the baseband component and causing the user equipment to enter the higher power mode based at least in part on identifying the indication.

20. The method of claim 19, further comprising:
identifying, within the non-coherent signal, the first resource element and the second resource element, wherein performing the one or more differential decoding operations is based at least in part on identifying the first resource element and the second resource element.

21. The method of claim 19, wherein:
receiving the non-coherent signal comprises receiving the non-coherent signal via a physical downlink control channel (PDCCH).

22. The method of claim 19, wherein the control message is transmitted as part of a configuration procedure.

23. The method of claim 19, wherein:
transmitting the control message indicating the capability of the user equipment to receive the non-coherent signal occurs prior to entering the lower power mode of operation.

24. The method of claim 19, wherein:
entering the lower power mode of operation comprises entering an inactive period of a discontinuous reception cycle, and wherein entering the higher power mode of operation comprises entering an active period of the discontinuous reception cycle.

25. The method of claim 19, wherein the wake-up component comprises a processor, a field-programmable gate array (FPGA), or an application-specific integrated circuit (ASIC).

26. An apparatus for wireless communications at a user equipment, comprising:
a radio frequency component for communicating with a network entity, the radio frequency component configured to:
transmit a control message indicating a capability of the user equipment to receive non-coherent signals; and
receive a non-coherent signal from the network entity when the user equipment operates in a lower power mode based at least in part on the control message;
a baseband component coupled with the radio frequency component and for processing communications received from the network entity, wherein at least a portion of the baseband component is inactive while the user equipment operates in the lower power mode; and
a wake-up component coupled with the radio frequency component and the baseband component, the wake-up component configured to:
perform one or more differential decoding operations on a first resource element and a second resource element of the non-coherent signal to generate an indicator value; and
identify an indication in the non-coherent signal that the user equipment is to transition from operating in the lower power mode to operating in a higher power mode based at least in part on the indicator value; and
activate the portion of the baseband component based at least in part on identifying the indication.

27. The apparatus of claim 26, wherein the wake-up component is associated with a first power source of the user equipment that is isolated from a second power source associated with the baseband component.

28. The apparatus of claim 26, wherein the wake-up component is further configured to:
identify, within the non-coherent signal, the first resource element and the second resource element preceding the first resource element, wherein performing the one or more differential decoding operations is based at least in part on identifying the first resource element and the second resource element.

29. The apparatus of claim 26, wherein the control message is transmitted as part of a configuration procedure.

30. The apparatus of claim 26, wherein the wake-up component comprises a processor, a field-programmable gate array (FPGA), or an application-specific integrated circuit (ASIC).

* * * * *